United States Patent
Ogawa

(10) Patent No.: US 7,206,850 B2
(45) Date of Patent: Apr. 17, 2007

(54) COMMUNICATION SYSTEM, RELAY DEVICE, SERVICE PROVIDING DEVICE, RELAYING METHOD, SERVICE PROVIDING METHOD AND PROGRAM PRODUCT

(75) Inventor: Hideharu Ogawa, Tokyo (JP)

(73) Assignee: Passology Co., Ltd., Tokyo (JP)

( * ) Notice: Subject to any disclaimer, the term of this patent is extended or adjusted under 35 U.S.C. 154(b) by 723 days.

(21) Appl. No.: 10/182,842

(22) PCT Filed: Jan. 31, 2001

(86) PCT No.: PCT/JP01/00654

§ 371 (c)(1),
(2), (4) Date: Jul. 30, 2002

(87) PCT Pub. No.: WO01/57686

PCT Pub. Date: Aug. 9, 2001

(65) Prior Publication Data

US 2003/0005049 A1 Jan. 2, 2003

(30) Foreign Application Priority Data

Jan. 31, 2000 (JP) ............................... 2000-020985
Jan. 31, 2000 (JP) ............................... 2000-022088

(51) Int. Cl.
*G06F 15/16* (2006.01)
*H04L 9/00* (2006.01)

(52) U.S. Cl. ........................ 709/229; 713/155
(58) Field of Classification Search ............. 709/203, 709/229; 713/155, 170, 184, 168; 726/5, 726/19

See application file for complete search history.

(56) References Cited

U.S. PATENT DOCUMENTS 5,960,086 A * 9/1999 Atalla .......................... 380/44

(Continued)

FOREIGN PATENT DOCUMENTS

JP 01-73449 A 3/1989

(Continued)

*Primary Examiner*—Saleh Najjar
*Assistant Examiner*—Vitali Korobov
(74) *Attorney, Agent, or Firm*—Mitchell P. Brook; Luce, Forward, Hamilton & Scripps LLP

(57) ABSTRACT

A communication system preferable to a technique of allowing only an ISP (151) connecting a user terminal to the Internet to manage information about the charging for the service provided to the user by an ASP (132) in the Internet so as to prevent credit card information on the credit card of the user from leaking into the Internet and preferable to dial-up server for providing connection with access limit to a computer communication network such as the Internet to a terminal, a relay device, a service providing device, a relay method, a service providing method, and a program product for realizing them. The feasibility of the relay between a terminal (111) and an ASP (132)I by an ISP (151) is determined on the basis of the relay condition (for example, the condition determined by the IP address and the port number) correlated with the user using the terminal (111). The system inquires of the ISP (151) if the ASP (132) provides a service to the terminal (111). If the user of the terminal (111) is registered in the ISP (151), the ISP (151) carries out the charging of the service in place of the ASP (132), and the ASP (132) provides the service to the terminal (111) through the ISP (151).

22 Claims, 17 Drawing Sheets

U.S. PATENT DOCUMENTS

| | | | |
|---|---|---|---|
| 6,691,231 B1 * | 2/2004 | Lloyd et al. | 726/5 |
| 6,725,376 B1 * | 4/2004 | Sasmazel et al. | 726/10 |
| 6,760,324 B1 * | 7/2004 | Scott et al. | 370/352 |
| 6,763,019 B2 * | 7/2004 | Mehta et al. | 370/352 |
| 6,879,574 B2 * | 4/2005 | Naghian et al. | 370/338 |
| 6,891,819 B1 * | 5/2005 | Inoue et al. | 370/338 |
| 2002/0112076 A1 * | 8/2002 | Rueda et al. | 709/245 |
| 2002/0156708 A1 * | 10/2002 | Ronen | 705/35 |

FOREIGN PATENT DOCUMENTS

| | | | |
|---|---|---|---|
| JP | 01073449 A | * | 3/1989 |
| JP | 09-114891 | * | 5/1997 |
| JP | 09-114891 A | | 5/1997 |
| JP | 10-307799 | | 11/1998 |
| JP | 11-242639 A | | 9/1999 |
| JP | 11-296583 A | | 10/1999 |
| WO | WO 97-46946 A | | 12/1997 |

* cited by examiner

| USER NAME | DATE / TIME | CONNECTION TIME (SECONDS) | PROVIDER | TYPE OF SERVICE | AMOUNT |
|---|---|---|---|---|---|
| ab123 | 2000/01/12 13:15:02 | 1832 | — | INTERNET CONNECTION | — |
| cd456 | 2000/01/12 14:15:31 | 315 | — | INTERNET CONNECTION | — |
| cd456 | 2000/01/12 14:16:34 | — | www.144.ne.jp | IMAGE INFORMATION | 120 YEN |
| ab123 | 2000/01/12 14:23:19 | 367 | — | INTERNET CONNECTION | — |
| va342 | 2000/01/12 14:24:05 | 183 | — | INTERNET CONNECTION | — |
| va342 | 2000/01/12 14:24:08 | — | www.sounds.co.jp | MUSIC INFORMATION | 350 YEN |
| va342 | 2000/01/12 14:24:18 | — | www.tsuhan.co.jp | MAIL-ORDER SELLING PRODUCT NUMBER A-153 | 3500 YEN |

FIG.5

COMMUNICATION SYSTEM, RELAY DEVICE, SERVICE PROVIDING DEVICE, RELAYING METHOD, SERVICE PROVIDING METHOD AND PROGRAM PRODUCT

TECHNICAL FIELD

The present invention relates to a communication system, a relay device, a service providing device, a relaying method, a service providing method, and a program product.

Particularly, the present invention relates to a communication system, a relay device, a service provider, a relaying method, a service providing method, and a product for realizing them. They are preferable to a technique of allowing only an ISP (Internet Service Provider) connecting a user terminal to the Internet to manage information about the charging for the service provided to the user by an ASP (Application Service Provider) in the Internet so as to prevent credit card information on the credit card of the user from leaking into the Internet and the ASP and preferable to a dial-up server for providing connection with access control to a computer communication network such as the Internet.

BACKGROUND ART

Conventionally, relay devices for connecting each terminal to a computer communications network, such as the Internet, etc. are provided. This type of relay device is called a "dial-up server" or a "dial-up router" in the case where the terminal is connected to the relay device through a telephone line, etc., and is called a "gateway" in the case where the terminal is connected to the relay device through a network cable (including the radio).

The enterprises or companies, which provide users of the terminal with access right for connecting to the Internet, using this type of relay device, are called ISPs. In a computer communications network, such as the Internet, there are ASPs which are included in the computer communications network and provide the user of each terminal with services.

Each user connects to the Internet through the ISP, and receives a service from the ASP using a Web browser. This service includes providing of electronic information (image information, voice information, information representing a search result of various databases, etc.). The service may include mail-order selling, etc.

In the field of such ISP business, various researches have been developed, in accordance with people's recent interest on the WWW (World Wide Web) and advancement of in WWW-related enterprise.

However, with a relay device used by the current ISPs, connections to the computer communications network, such as the Internet, etc. is provided to the user terminal. Hence, the connection to the ASP, providing electronic information which should not really be shown to kids, can not be controlled.

When receiving a chargeable service from an ASP, the user needs to inform the ASP about his/her name and number information on his/her credit card. In this case, the name and number information of the credit card is transmitted in the Internet. This transmission may results in that the user may suffer a swindle using the user's credit card. It is highly demanded that not only the information regarding the user's credit card, but also credit information, such as the user address, name, phone number, etc., be prevented from flowing over the computer communications network.

There is a technique for transmitting the credit information using SSL (Secure Socket Layer) protocol. Even in this case, the credit information still flows over the communications network.

In many cases, the user has made a contract with an ISP, so that the connection charges are paid through a credit card. Hence, if the ISP can collect the charges for the service provided to the user by an ASP, without giving the credit card information to the ASP, it is safe and convenient for the user.

A computer communication network is built between an ASP and an ISP, which are in a cooperative relationship with each other, in the Internet excluding their competitors. In this network, while services are provided to terminal users, it is highly demanded that customers be adequately selected and that the advertisement effect be enhanced.

Further, it is also highly demanded that, in a case where such a form can be realized, that a free network connection service be provided, while an ASP pays the charges for using the ISP for the user.

An object of the present invention is to provide a communication system, a relay device, a service provider, a relaying method, a service providing method, and a program product for realizing these, which are suitable for a dial-up server; wherein billing information, for a service to be provided from an ASP in the Internet to a user, is managed only by an ISP for connecting a terminal of the user to the Internet; and which is preferable for managing user-credit-card information not to be leaked into the Internet and for providing terminals with connection having access control toward a computer communications network, such as the Internet, in order to solve the above.

DISCLOSURE OF INVENTION

A communication system according to the first aspect of the present invention is configured to include a terminal, a relay device and a service provider.

Here, the terminal sends a user name to the relay device.

Next, the relay device receives the user name from the terminal, and assigns the terminal a communication identifier in association with the user name.

The terminal sends a service-request message, whose addresser corresponds to the assigned communication identifier and addressee corresponds to a communication identifier of the service provider, to the relay device.

The relay device receives the service-request message from the terminal, and sends the service-request message to the service provider.

Further, the service provider receives the service-request message from the relay device, and sends an inquiry message for inquiring whether to provide a service to the communication identifier specified in the service-request message, to the relay device.

The relay device receives the inquiry message, and sends a response message, to the service provider, specifying to provide a service, in a case where the communication identifier specified in the inquiry message has been assigned in association with the user name, and, if not, specifying not to provide a service.

The service provider receives the response message from the relay device, and sends a service-providing message, whose addressee corresponds to the communication identifier specified in the service-request message in a case where the response message specifies to provide a service and whose addresser is the service provider, to the relay device.

The relay device receives the service-providing message from the service provider, and sends this to the terminal; and The terminal receives the service-providing message from the relay device.

The communication system of the present invention may be configured as follows:

The inquiry message or the service-providing message includes billing information of the service to be provided.

The relay device stores the billing information corresponding to the user name corresponding to the assigned communication identifier; and, in a case where to send the service-providing message to the terminal, adds or sums the billing information of the service to be provided, included in the inquiry message or the service-providing message, to or with the billing information stored in association with the user name, so as to update the billing information stored in association with the user name.

A relay device according to the second aspect of the present invention may be communicable with a terminal and a service provider, and is configured to include a user-name receiver, a communication-identifier assignor, a service-request message receiver, a service-request message sender, an inquiry message receiver, a response-message sender, a service-providing message receiver, and a service-providing message sender.

The user-name receiver receives a user name sent from the terminal.

The communication-identifier assignor assigns the terminal a communication identifier in association with the received user name.

The service-request message receiver receives a service-request message, whose addresser corresponds to the assigned communication identifier and addressee corresponds to a communication identifier of the service provider and which is sent from the terminal.

The service-request message sender sends the received service-request message to the service provider.

The inquiry-message receiver receives an inquiry message for inquiring whether to provide a service to the communication identifier specified in the sent service-request message, the inquiry message being sent from the service provider.

The response-message sender sends, to the service provider, a response message specifying to provide a service in a case where the communication identifier specified in the received inquiry message is assigned in association with the received user name, and, if not, specifying not to provide a service.

The service-providing message receiver receives a service-providing message for providing a service to the communication identifier assigned in association the received user name, the service-providing message being sent from the service provider.

The service-providing message sender sends the received service-providing message to the terminal.

The relay device of the present invention may be configured to include a billing-information storage section and a billing-information updating section.

The inquiry message or the service-providing message may include billing information of the service to be provided.

The billing-information storage section may store the billing information in association with the received user name.

The billing-information updating section may add or sum the billing information of the to-be-provided service included in the inquiry message or the service-providing message, to or with the billing information stored in association with the received user name, in a case where the service-providing message sender sends the service-providing message to the terminal, so as to update the billing-information storage section.

In the relay device of the present invention, updating by the billing-information updating section may be performed before sending of the response message by the response-message sender.

In the relay device of the present invention, updating by the billing-information updating section may be performed before sending of the service-providing message by the service-providing message sender.

The relay device of the present invention may further include a service-received message receiver.

The service-received message receiver may receive a service-received message sent from the terminal, in a case where the terminal receives the service-providing message sent from the service-providing message sender.

Updating by the billing-information updating section may be performed after receiving of the service-received message by the service-received message receiver.

The relay device of the present invention may be configured to further include, an authentication-character-string generator/sender may include a password-character string receiver, and a rule storage section.

The authentication-character-string generator/sender generates an authentication character string and sends this to the terminal, in a case where the user name is received by the user-name receiver;

The password-character string receiver receive a password-character string sent from the terminal.

The rule storage section may store a rule for generating the password-character string from the authentication character string, in association with the user name.

Further, the communication-identifier assignor assigns the terminal a communication identifier, in a case where the password-character string received by the password-character-string receiver is generated from the authentication character string generated by the authentication-character-string generator/sender, based on the rule stored in the rule storage section in association with the user name received by the user-name receiver.

The communication-identifier assignor assigns the terminal a communication identifier, in a case where the user name is received by the user-name receiver.

The communication-identifier invalidating section invalidates the communication identifier assigned by the communication-identifier assignor to the terminal, in a case where the password-character string received by the password-character string receiver is not generated from the authentication character string generated by the authentication-character-string generator/sender, based on the rule stored in the rule storage section in association with the user name received by the user-name receiver.

A relay device according to the third aspect of the present invention relays a message, to a communicating computer communications network, including information specifying a communication identifier of an addresser and a communication identifier of an addressee, and is configured to include terminal communicator, a computer-communication-network communicator, a communication-identifier assignor, and an upward relay device.

The terminal communicator is connected to a terminal and communicates with the terminal for messages.

The computer-communication-network communicator is connected to the computer communications network and communicates with the computer-communications network for messages.

The communication-identifier assignor assigns the terminal a communication identifier.

The upward relay device sends and relays a message, sent from the terminal via the terminal, to the computer communications network through the computer-communication-network communicator, in a case where a communication identifier of an addresser specified in information included in the message received from the terminal via the terminal communicator is a communication identifier assigned by the communication-identifier assignor and a communication identifier of an addressee specified in the information included in the message satisfies a relay condition, and does not send the message thereto, in a case where the relay condition is not satisfied.

The relay device of the present invention may be configured to further include, in place of the upward relay device or in addition to the upward relay device, a downward relay device.

The downward relay device sends and relays a message, sent from the computer communication network and received through the computer-communication-network communicator, to the terminal through the terminal communicator, in a case where a communication identifier of an addressee specified in information included in the message is a communication identifier assigned by the communication-identifier assignor, and a communication identifier of an addresser specified in the information included in the message satisfies the relay condition.

The relay device of the present invention may be configured to further include a relay-forbiddance-communications-identifier storage section The relay-forbiddance-communications identifier storage section stores communication identifiers in advance The relay condition is satisfied in a case where the communication identifier of the addressee or addresser specified in the information included in the message is not included in the communication identifiers stored in advance in the relay-forbiddance-communications-identifier storage section.

The relay device of the present invention may further include a user-name receiver, and may be configured as follows:

The user-name receiver receives a user name sent from the terminal through the terminal communicator.

The relay-forbiddance-communications-identifier storage section stores a communication identifier in advance in association with the user name received by the user-name receiver.

Further, the relay condition is satisfied in a case where the communication identifier of the addressee or addresser specified in the information included in the message is not included in the communication identifiers stored in advance in the relay-forbiddance-communication-identifier storage section in association with the user name.

The relay device of the present invention may further include a user-name receiver, an authentication-character-string generator/sender, a password-character-string receiver, and a rule storage section, and may be configured as follows:

The user-name receiver receives a user name sent form the terminal via the terminal communicator.

The authentication-character-string generator/sender generates an authentication character string, and sends this to the terminal through the terminal communicator.

The password-character-string receiver receives a password-character string sent from the terminal through the terminal communicator.

The rule storage section stores a rule for generating the password-character string from the authentication character string, in association with the user name.

The communication-identifier assignor assigns the terminal a communication identifier, in a case where the password-character string received by the password-character-string receiver is generated from the authentication character string generated by the authentication-character-string generator/sender based on the rule stored in the rule storage section in association with the user name received by the user-name receiver.

The relay device of the present invention may further include a communication-identifier invalidating section, and is configured as follows:

The communication-identifier assignor assigns the terminal a communication identifier, in a case where the user name is received by the user-name receiver, and The communication-identifier invalidating section invalidates the communication identifier assigned to the terminal by the communication-identifier assignor, in a case where the password-character string received by the password-character-string receiver is not generated from the authentication character string generated by the authentication-character-string generator/sender based on the rule stored in the rule storage section in association with the user name received by the user-name receiver.

The communication-identifier assignor may select a communication identifier, which is currently not assigned to any other terminals, from a plurality of communication identifiers which are set in advance, and assign the terminal this communication identifier.

The relay device of the present invention may further include a relay-forbiddance-communications-identifier storage section.

The relay-forbiddance-communications-identifier storage section stores communication identifiers in advance.

The relay condition is satisfied in a case where the communication identifier of the addressee or addresser specified in the information included in the message is not included in the communication identifiers stored in advance in the relay-forbiddance-communications-identifier storage section.

The relay device of the present invention may further include a user-name receiver.

The user-name receiver receives a user name sent from the terminal through the terminal communicator.

The relay-forbiddance-communications-identifier storage section stores a communication identifier in advance in association with the user name received by the user-name receiver.

The relay condition is satisfied in a case where the communication identifier of the addressee or addresser specified in the information included in the message is not included in the communication identifiers stored in advance in the relay-forbiddance-communication-identifier storage section in association with the user name.

A service provider according to the fourth aspect of the present invention may be communicable with a relay device and be configured to comprise a service-request message receiver, an inquiry-message sender, a response-message receiver, and a service-providing message sender.

The service-request message receiver receives a service-request message, whose addresser corresponds to a communication identifier assigned by the relay device and whose addressee corresponds to a communication identifier of the service provider, from the relay device.

The inquiry-message sender sends, to the relay device, an inquiry message for inquiry whether to provide a service to the communication identifier specified in the service-request message received by the service-request message receiver.

The response-message receiver receives a response message specifying whether to provide a service, the response message being sent from the relay device.

The service-providing message sender sends, to the relay device, a service-providing message whose addressee corresponds to the communication identifier specified in the service-request message and whose addresser is the service provider, in a case where the response message received by the response-message receiver specifies to provide a service.

The inquiry message or the service-providing message may include billing information of the service to be provided.

A relaying method according to the fifth aspect of the present invention is for relaying communications between a terminal and a service provider, and comprise a user-name receiving step, a communication-identifier assigning step, a service-request message receiving step, a service-request message sending step, an inquiry-message receiving step, a response-message sending step, a service-providing message receiving step, and a service-providing message sending step.

In the user-name receiving step, a user name is sent from the terminal.

In the communication-identifier assigning step, a communication identifier is assigned to the terminal in association with the received user name.

In the service-request message receiving step, a service-request message, whose addresser corresponds to the assigned communication identifier and addressee corresponds to a communication identifier of the service provider, and which is sent from the terminal, is received.

In the service-request message sending step, the received service-request message is sent to the service provider.

In the inquiry-message receiving step, an inquiry message for inquiring whether to provide a service to a communication identifier specified in the sent service-request message, and which is sent from the service provider, is received from the service provider.

In the response-message sending step, a response message specifying to provide a service in a case where the communication identifier specified in the received inquiry message is assigned in association with the received user name, and, if not, specifying not to provide a service, is sent to the service provider.

Further, in the service-providing message receiving step, a service-providing message for providing a service to the communication identifier assigned in association with the received user name is received from the service provider.

In the service-providing message sending step, the received service-providing message is sent to the terminal.

The relaying method of the present invention may be configured to further include a billing-information updating step.

The inquiry message or the service-providing message may include billing information of the service to be provided.

In the billing-information updating step, in a case where the service-providing message is sent to the terminal at the service-providing message sending step, the billing information is updated if there is billing information stored in association with the received user name, by adding the billing information of the service to be provided and specified in the inquiry message or the service-providing message therewith, and, if there is not such information, the billing information is stored in association with the user name.

In the relaying method of the present invention, updating at the billing-information updating step may be performed before sending of the response message at the response-message sending step.

In the relaying method of the present invention, updating at the billing-information updating step may be performed before sending of the service-providing message at the service-providing message sending step.

The relaying method of the present invention may further include a service-received message receiving step.

In the service-received message receiving step, a service-received message sent from the terminal is received, in a case where the terminal receives the service-providing message sent at the service-providing message sending step.

In the billing-information updating step, updating is performed after receiving of the service-received message at the service-received message receiving step.

The relaying method of the present invention may further include an authentication-character-string generating/sending step and a password-character string receiving step.

In the authentication-character-string generating/sending step, an authentication character string is generated and sent to the terminal, in a case where the user name is received at the user-name receiving step; and In the password-character string receiving step, a password-character string sent from the terminal is received.

Further, in the communication-identifier assigning step, a communication identifier is assigned to a terminal, in a case where the password-character string received at the password-character string receiving step is generated from the authentication character string generated at the authentication-character-string generating/sending step, based on a rule stored in advance in association with the user name received at the user-name receiving step.

The relaying method of the present invention may be configured to further include a communication-identifier invalidating step.

The communication-identifier assigning step assigns the terminal a communication identifier, in a case where a user name is received at the user-name receiving step.

In the communication-identifier invalidating step, the communication identifier assigned to the terminal at the communication-identifier assigning step is invalidated, in a case where the password-character string received at the password-character-string receiving step is not generated from the authentication character string generated at the authentication-character-string generating/sending step based on the rule stored in advance in association with the user name received at the user-name receiving step.

A relaying method according to the sixth aspect of the present invention is for relaying a message to a computer communication network for performing communications for messages including information specifying a communication identifier of an addresser and a communication identifier of an addressee, and method may be configured to include a communication-identifier assigning step, a terminal-receiving step and an upward relaying step.

In the communication-identifier assigning step, a communication identifier is assigned to a terminal.

In the terminal-receiving step, a message sent from the terminal is received.

In the upward relaying step, a message is sent and relayed to the computer communication network, in a case where a communication identifier of an addresser specified in information included in the message received at the terminal-receiving step is a communication identifier assigned at the communication-identifier assigning step, and a communication identifier of an addressee specified in the information included in the message satisfies a relay condition, and not sending the message thereto in a case where the relay condition is not satisfied.

The relaying method of the present invention may further include, in place of the terminal-receiving step and the upward relaying step or in addition to these, a computer-communication-network receiving step and a downward relaying step.

In the computer-communication-network receiving step, a message sent from the computer communication network is received.

In the downward relaying step, a message is sent and relayed, in a case where a communication identifier of an addressee specified in information included in the message received at the computer-communication-network receiving step is a communication identifier assigned at the communication-identifier assigning step, and a communication identifier specified in the information included in the message satisfies the relay condition.

In the relaying method of the present invention, the relay condition is satisfied, in a case where the communication identifier of the addressee or addresser specified in the information included in the message is not any of communication identifiers stored in advance.

The relaying method may further include a user-name receiving step.

In the user-name receiving step, the user name sent from the terminal is received.

The relay condition is satisfied, in a case where the communication identifier of the addressee or addresser specified in the information included in the message is not any of communication identifiers stored in advance in association with the user name.

The relaying method of the present invention may further include a user-name receiving step, an authentication-character string generating/sending step, and a password-character-string receiving step.

In the user-name receiving step, a user name sent from the terminal is received.

In the authentication-character-string generating/sending step, an authentication character string is generated and sent to the terminal.

In the password-character-string receiving step, a password-character string sent from the terminal is received.

The communication-identifier assigning step assigns the terminal a communication identifier, in a case where the password-character string received at the password-character string receiving step is generated from the authentication character string generated at the authentication-character-string generating/sending step based on a rule stored in advance in association with the user name received at the user-name receiving step.

The relaying method of the present invention may further include a communication-identifier invalidating step.

In the communication-identifier assigning step, a communication identifier is assigned to a terminal, in a case where the user name is received at the user-name receiving step.

In the communication-identifier invalidating step, a communication identifier assigned to the terminal at the communication-identifier assigning step is invalidated, in a case where the password-character string received at the password-character-string receiving step is not generated from the authentication character string generated at the authentication-character-string generating/sending step, based on the rule stored in advance in association with the user name received at the user-name receiving step.

A service providing method according to the seventh aspect of the present invention, is for providing a service through a relay device, and may be configured to include a service-request message receiving step, an inquiry-message sending step, a response-message receiving step, and a service-providing message sending step.

In the service-request message receiving step, a service-request message, whose addresser corresponds to the communication identifier assigned by the relay device and which is sent from the relay device, is received.

In the inquiry-message sending step, an inquiry message for inquiring whether to provide a service to the communication identifier specified in the service-request message received at the service-request message receiving step is sent to the relay device.

In the response-message receiving step, a response message specifying whether to provide a service and sent from the relay device is received.

In the service-providing message sending step, a service-providing message whose addressee corresponds to the communication identifier specified in the service-request message and addresser is the service provider is sent to the relay device, in a case where the response message received at the response-message receiving step specifies to provide a service.

In the service providing method of the present invention, the inquiry message or the service-providing message may include billing information, i.e. price information, to the service to be provided, and may not include the credit card information of the user.

In the above-described invention, communications may be performed between the terminal, the relay device and the service provider using TCP/IP, and the communication identifier may be specified based on an IP address and a port number.

A program product according to the eighth aspect of the present invention, is configured for controlling a computer, which is communicable with a terminal and a service provider, to serve as the above-described relay device or the service provider.

The program product of the present invention may be configured, by storing a program onto a computer readable information recording medium, such as a compact disk, a floppy disk, a hard disk, a magneto-optical disk, a digital video disk, a magnetic tape, a semiconductor memory, etc.

The program which can be realized by the program product of the present invention is executed by a CPU (Central Processing Unit) included in a computer and any other devices or peripheral devices. Then, the computer serves as the relay device or service provider of the present invention, thereby using the relaying method or service providing method of the present invention. By this, the above-described relay device, service provider, relaying method and service providing method can be realized.

Independently from the computer, the program product of the present invention can be distributed or sold. Further, the program according to the program product of the present invention is transmitted through a computer communica-

BRIEF DESCRIPTION OF DRAWINGS

FIG. 5 is an explanatory diagram showing the state in which billing information is stored.

BEST MODE FOR CARRYING OUT THE INVENTION

An embodiment for practicing the present invention will now be described. Embodiments, as will be explained later, are to illustrate the present invention, not to limit the scope of the present invention. For those skilled in the art, the present invention may be applicable to embodiments including replaced elements equivalent to each or entire elements of the present invention, and such embodiments are, therefore, within the scope of the present invention.

In the explanation below, TCP/IP communications will be described by way of example. In the TCP/IP communications, an acknowledge message indicating that various messages have arrived is sent to a sender that has sent such messages. For easy understanding, in the following description, explanations will not be made to transmission of the acknowledge message in the TCP/IP communications.

(Communication System)

Figure 1:
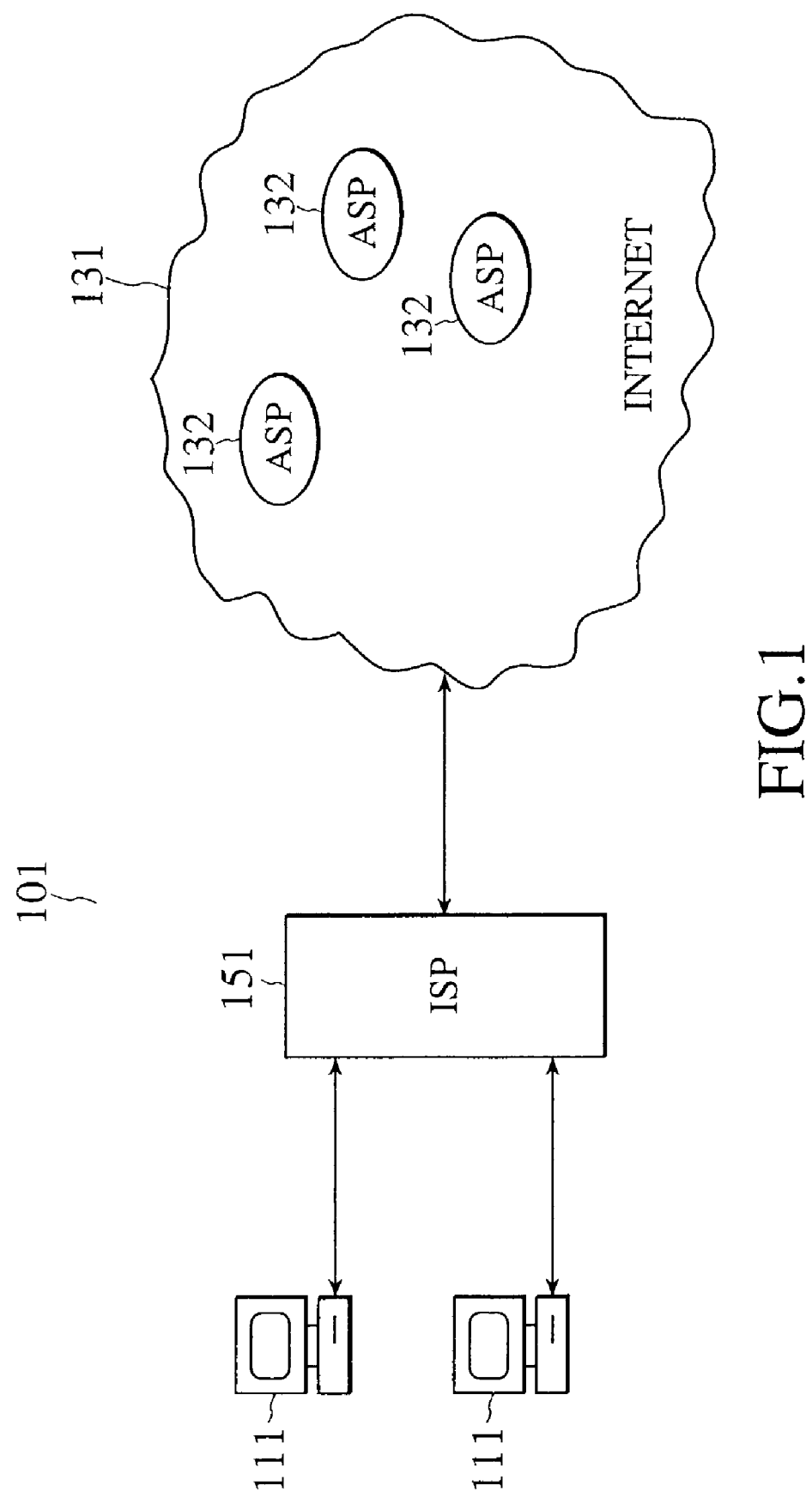
FIG. 1 is an exemplary diagram showing the schematic structure of a communication system of the present invention.

FIG. 1 is an exemplary diagram showing the schematic structure of a communication system 101 of the present invention.

Each user accesses Internet 131 from a terminal 111. Transmission of various messages between each ASP 132 within the Internet 131 and each terminal 111 is relayed by an ISP 151. The transmission of messages is performed based on the TCP/IP protocol.

Each ASP 132 serves as a service provider of the present invention, while the ISP 151 serves as a relay device (a repeater) of the present invention.

Figure 2:
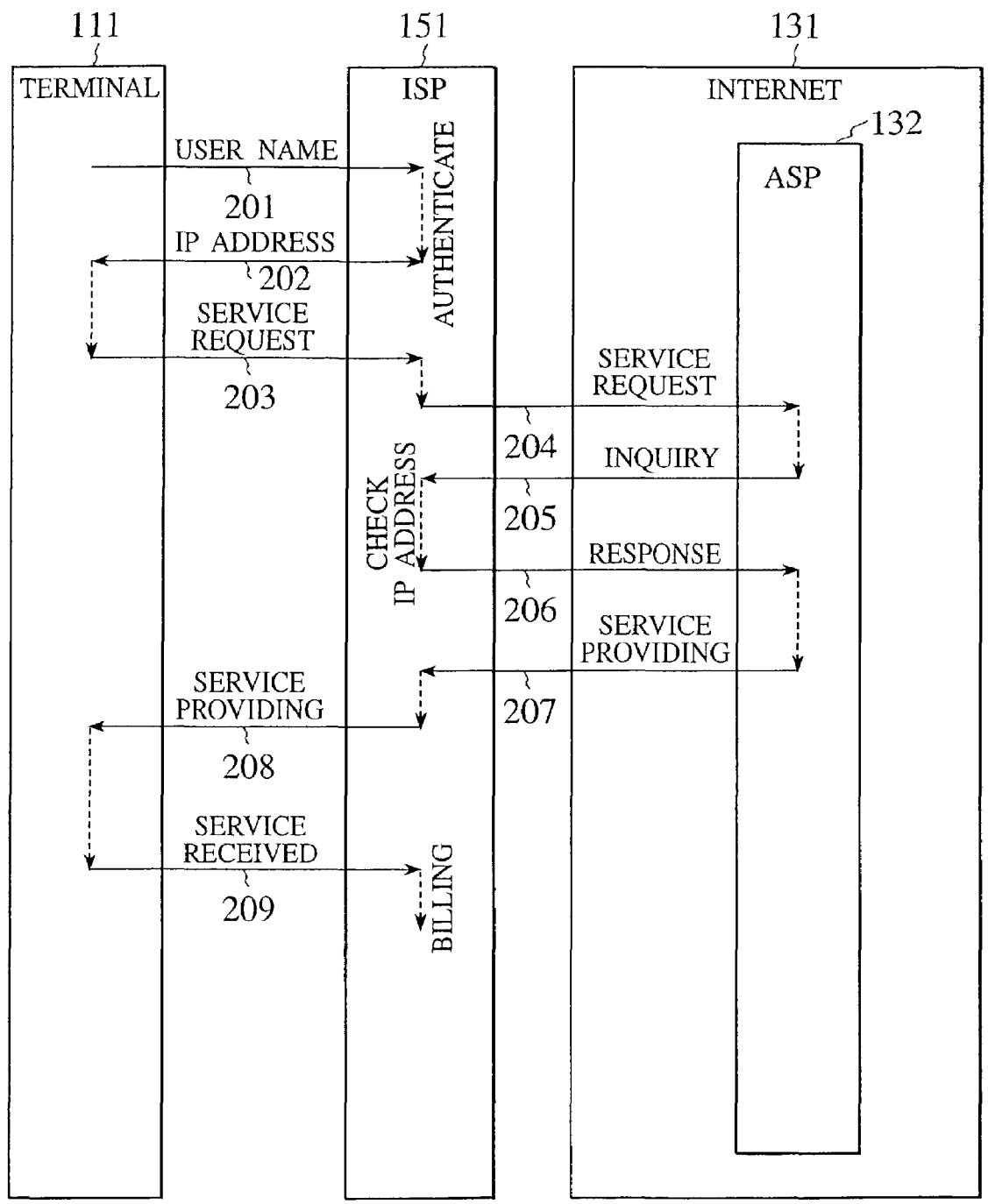
FIG. 2 is an explanatory diagram showing the state of communications in the communication system of the present invention.

FIG. 2 is an explanatory diagram showing the typical state of message transmission, since the terminal 111 accesses the Internet 131 through the ISP 151, until it receives a service provided from the ASP 132.

The terminal 111 sends a connection request with a specified user name, to the ISP 151 (201). At this time, not only a well-know dial-up connection technique, but also a user-authentication method using some rules can be used, as will be described later.

The ISP 151 authenticates this user, and assigns the terminal 111 a currentlyunused IP address (202). Thus, the ISP 151 serves as a DHCP (Dynamic Host Configuration Protocol) server, while the terminal 111 serves as a DHCP client.

Upon assignment of the IP address, the terminal 111 can access each ASP 132 in the Internet 131. At this time, the terminal 111 sends a service-request message to the ASP 132 through the ISP 151 (203, 204).

Then, the ASP 132 checks the sender-IP address included in the service-request message, and sends an inquiry message for inquiring whether a service can be provided to the corresponding IP address to the ISP 151 (205).

The ISP 151 examines the inquiry message, checks the user name of the terminal 111 having the assigned IP address, and confirms whether an amount of money is charged to the user or whether the user has right to get the service. In the case where the service can be provided to the user, the ISP 151 sends a response message indicating that the service can be provided, to the ASP 132 (206).

The ASP 132 receives the response message. In the case where to provide the user with the service, the ASP 132 sends a service-providing message to the sender-IP address, to the sender IP address included in the service-providing message. At this time, the ISP 151 relays this service-providing message (207, 208).

In this embodiment, the terminal 111 having received the service-providing message sends a service-received message to the ISP 151, and the ISP 151 receives this message (209), thereafter executing a billing process.

In this manner, the billing processes for charging the user for the provided service are all executed by the ISP 151. The user personal information to be transmitted in the Internet 131 in the above session is only the IP address dynamically assigned to the terminal 111. Thus, various information of the credit cards can be prevented from being leaked out. As will be described later, various personal information can similarly be prevented from being leaked out.

From the aspect of the user of the terminal 111, the user name and password may be input only when connecting to the ISP 151. Even if services are provided over and over again during the connection, it is not necessary to input those information afterwards. Hence, there is no need to input the information, and the terrible situation that the information is looked by others or stolen by a computer virus may unlikely to occur. Thus, the security of the information is improved.

Further, from the aspect of the ASP 132, the services to be provided can be managed by a server of the same company, and the company requests another company for the billing. Hence, the management of products and the management of account book can totally be separated.

(Relay Device)

Figure 3:
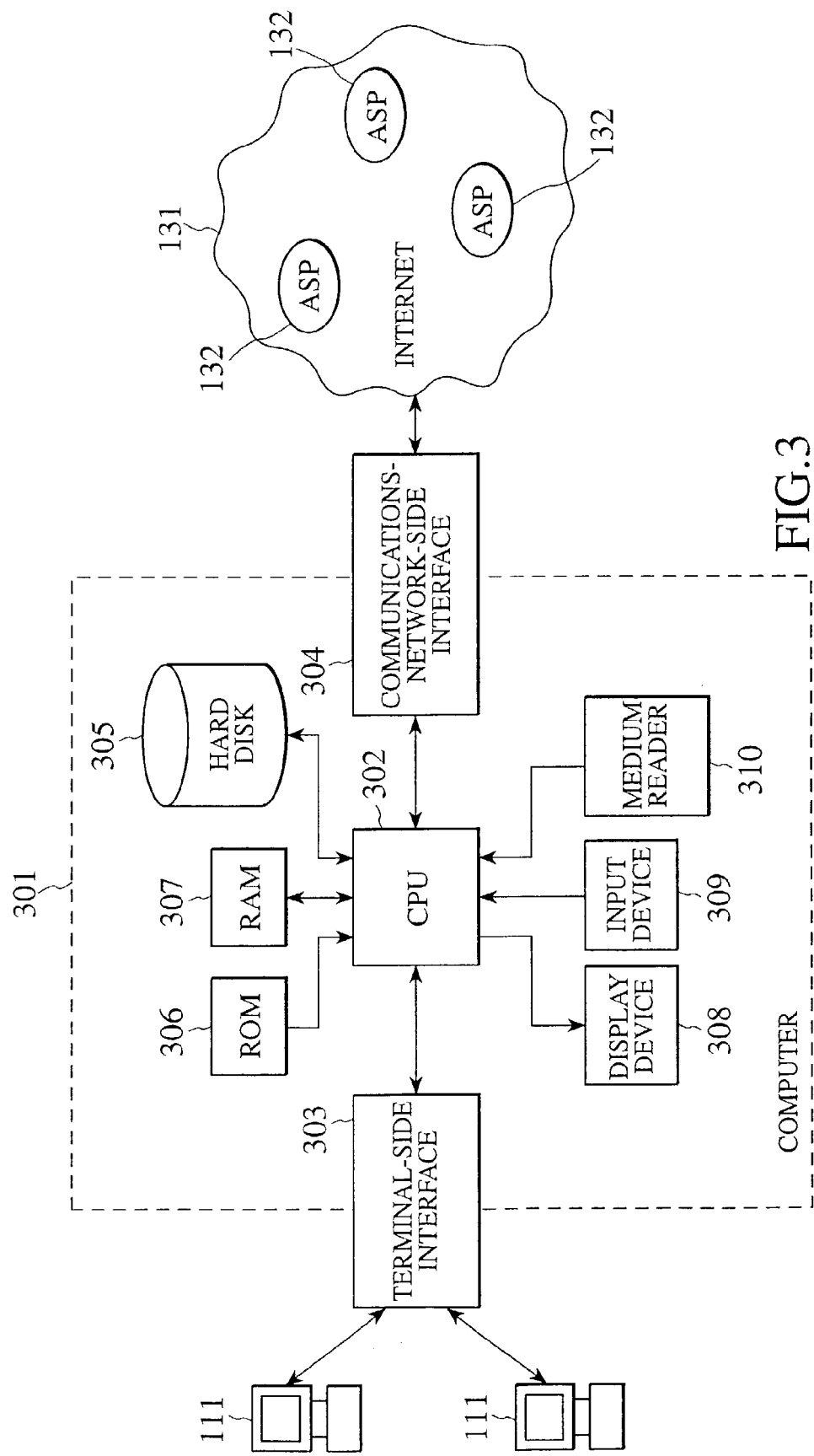
FIG. 3 is an exemplary diagram showing the schematic structure of a computer which serves as a relay device of the present invention.

FIG. 3 is an exemplary diagram showing the schematic structure of a computer realizing the ISP 151 serving as a relay device of the present invention. Description will now be made with reference to FIG. 3.

Each section in a computer 301 is controlled by a CPU 302. The terminal 111 requests a terminal-side interface 303 for connection through a telephone line, etc. The CPU 302 performs communications with the terminal 111 through the terminal-side interface 303. The terminal 111 may include, as shown in the illustration, one or more terminals. As a terminal-side interface 303, a modem or a terminal adapter is used.

Each device including the ASP 132, etc. in the Internet 131 performs communications with the CPU 302 through a communications-network-side interface 304. As the communications-network-side interface 304, other than various network interface cards, a modem or a terminal adapter may be used.

Upon request for connection from the terminal 111, the CPU 302 dynamically assigns this terminal 111 an IP address and a port number (hereinafter referred simply as an "IP address"). This IP address serves as a communications identifier of this terminal 111. The CPU 302 selects the IP address from one or more IP address recorded in advance in the hard disk 305 without the repetition of the same IP address, and assigns terminal 111 this IP address.

In this manner, once the IP address is assigned to the terminal 111, it is ready to perform TCP/IP communications between the terminal 111 and each device, such as the ASP 132 within the Internet 131. Each message to be transmitted in the communications has an IP address of the sender and an IP address of the addressee written thereinto. In the TCP/IP communications, other than the computer 301, any device other than the addressee device in the Internet 131 relays this message using a bucket-brigade technique, so as to transmit the message.

Upon application of the computer 301, the CPU 302 executes an IPL (Initial Program Loader) program recorded in a ROM (Read Only Memory) 306. The IPL program includes an instruction: for storing a program recorded in a predetermined location of the hard disk 305 into a RAM (Random Access Memory) 307; and executing the stored program. By this process, various OS (Operating System) or a program for controlling the computer 301 to serve as a gateway for the ISP 151 can operate.

The CPU 302 uses the RAM 307 which temporarily stores a message, when relaying the message.

Other than this, the computer 301 may include a display device 308, such as a CRT (Cathode Ray Tube) display, etc, or an input device 309, such as a keyboard, a mouse, etc. The administrator of the relay device configures the computer 301 or administers the computer 301 using the above devices.

The computer 301 may include a medium reader 310, such as a CD-ROM (Compact Disk ROM) drive or an FD (Floppy Disk) drive, for installing programs into the computer 301. Programs can be installed from a medium, such as a CD-ROM or an FD, into the hard disk 305. Programs stored in any devices in the Internet 131 can be installed into the hard disk 305.

Figure 4:
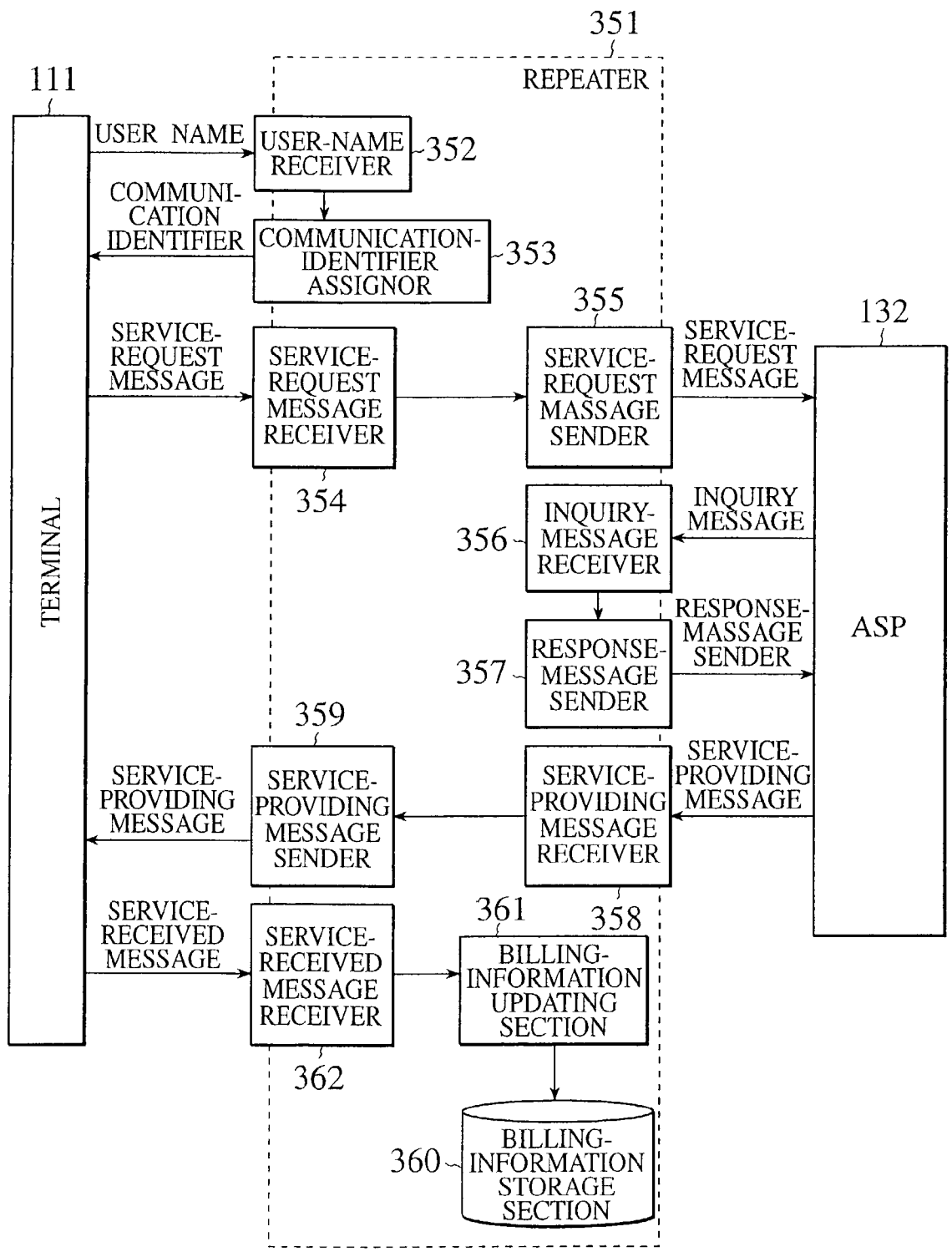
FIG. 4 is an exemplary diagram showing the schematic structure of the relay device of the present invention.

FIG. 4 is an exemplary diagram showing the schematic structure of the relay device of the present invention. With reference to FIGS. 3 and 4, the correspondence between the relay device and each section included the ISP 151 will now be described.

A user-name receiver 352 of a relay device 351 receives a user name sent from the terminal 111. Thus, the terminal-side interface 303 serves as the user-name receiver 352.

A communications-identifier assignor 353 assigns the terminal 111 a communications identifier (an IP address), in association with the received user name. Thus, in cooperation with the terminal-side interface 303, the CPU 302 serves as the communications-identifier assignor 353. Those IP addresses which are not currently used are stored in the hard disk 305 or RAM 307. From the currently unused IP addresses, a target IP address to be assigned is selected.

A service-request message receiver 354 receives a service-request-message addressed to one of the ASPs 132 from the terminal 111. The sender of this service-request message corresponds to the communications identifier (IP address) assigned to the terminal 111. Thus, the terminal-side interface 303 serves as the service-request message receiver 354.

Further, a service-request message sender 355 sends the received service-request-message to any of the ASPs 132 within the Internet 131. Hence, the communications-network-side interface 304 serves as the service-request message sender 355.

An inquiry-message receiver 356 receives an inquiry message for inquiring whether the ASP 132 provides the terminal 111 with a service. Hence, the communications-network-side interface 304 serves as the inquiry-message receiver 356.

A response-message sender 357 determines whether the IP address of a service receiver which is specified in the inquiry message is the one assigned to the terminal 111. In the case where it is determined that the IP address is the one assigned to the terminal 111, the response-message sender 357 generates a response message specifying that a service will be provided to the terminal 111. In the case where it is determined that the IP address is not the one assigned to the terminal 111, the response-message sender 357 generates a response message specifying that no service will be provided to the terminal 111.

The response-message sender 357 sends the generated response message to the ASP 132. The received inquiry message is temporarily stored in the RAM 307. The CPU 302 examines this message, generates a response message, and sends using the communications-network-side interface 304. Hence, those devices serve as the response-message sender 357.

Further, a service-providing-message receiver 358 receives a service-providing message for providing a service to the terminal 111 from the ASP 132. Thus, the communications-network-side interface 304 serves as the service-providing-message receiver 358.

A service-providing-message sender 359 sends the received service-providing-message to the terminal 111. Thus, the terminal-side interface 303 serves as the service-providing-message sender 359.

Further, in this embodiment, the inquiry message or the service-providing message specifies billing information for a service to be provided.

A billing-information storage section 360 stores billing information in association with the received user name. Thus, the hard disk 305 serves as the billing-information storage section 360.

In the case where the service-providing message will be sent or has been sent to the terminal 111, a billing-information updating section 361 adds or calculates billing information into the billing-information storage section 360, in association with the user name of the terminal 111, so as to update the billing-information storage section 360. This billing information is one for a to-be-provided service specified in the service-providing message or service-providing message.

Further, a service-received-message receiver 362 receives a service-received message sent from the terminal 111. Thus, the terminal-side interface 303 serves as the service-received-message receiver 362.

FIG. 5 is an explanatory diagram showing the state in which billing information is stored in the hard disk 305.

As shown in FIG. 5, billing information is stored in the form of a table, wherein each row corresponds to each billing-information item. For example, a user "ab123" has used the ISP 151 for 1832 seconds, since 13:15:02 pm on Jan. 12, 2000. A user "cd456" has got a service for image information, from the ASP 132 having a server name "www.144.ne.jp" on 14:16:34 on Jan. 12, 2000. The charge of this service for image information is 120 yen. Other than the above, information regarding a discount service for connecting to a particular ASP 132 can be stored. Such information is adequately summed up, thereby charging each user for the service.

Such information is summed up for each ASP 132, thereby making payment to each ASP 132 for the user.

The updating to be done by the billing-information updating section 361 is performed after reception (after "209" of FIG. 2) of the service-received message, in this embodiment. However, the updating may be done before (between "205" and "206" of FIG. 2) transmission of the response message or before (between "207" and "208" of FIG. 2) transmission of the service-providing message. When to perform the updating can be set or changed in accordance with the structure of the ISP 151 or the ASP 132.

(Connection-start Process)

Figure 6:
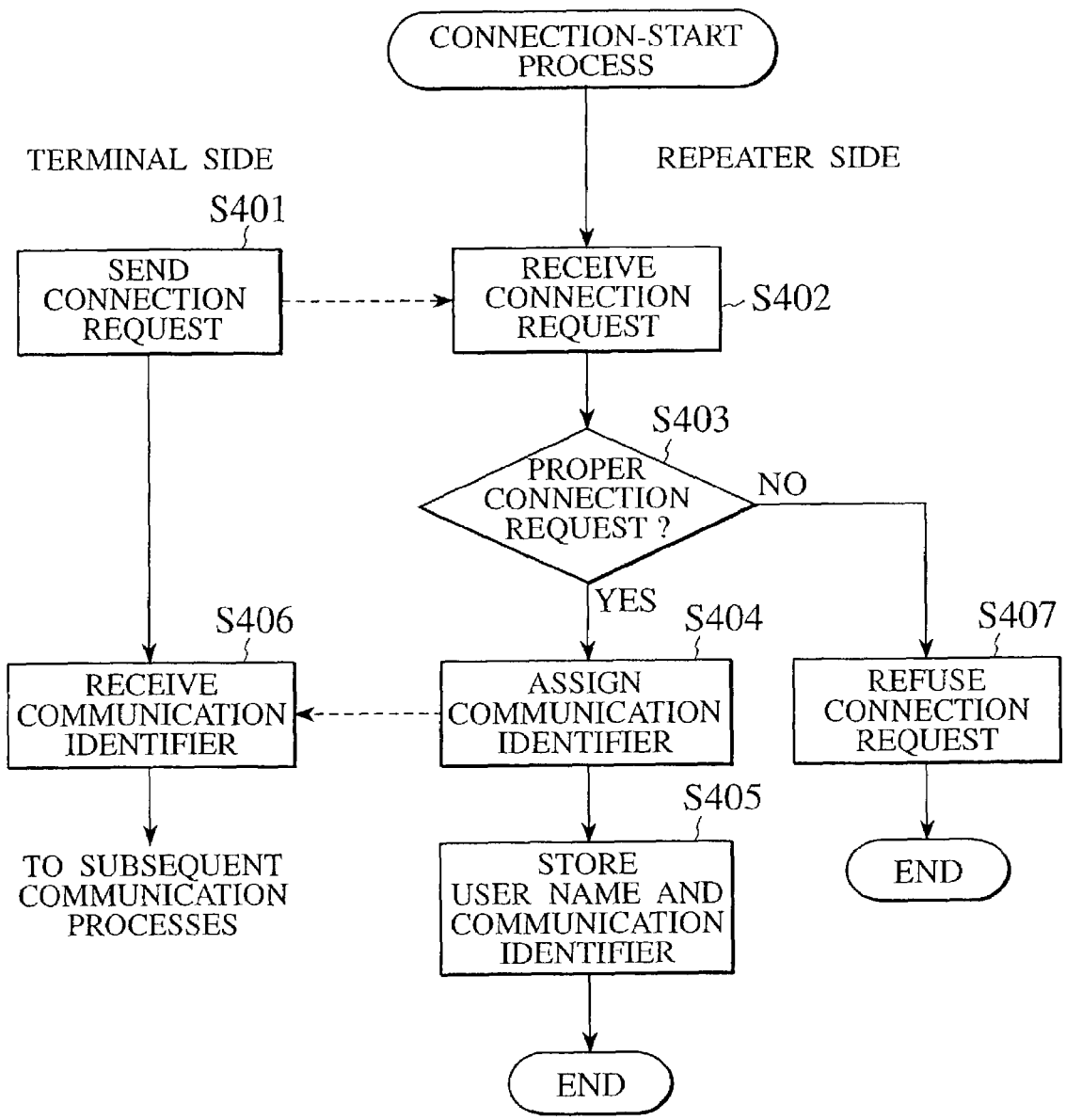
FIG. 6 is a flowchart showing the flow of a connection-start process carried out by the relay device of the present invention.

FIG. 6 is a flowchart showing the flow of a connection-start process, for assigning the terminal 111 a communications identifier in the case where the computer 301 shown in FIG. 3 serves as an ISP 151 (the relay device 351 of the present invention).

If the terminal 111 sends a connection request for connecting to the Internet 131, to the computer 301 (Step S401), the computer 301 receives this connection request through the terminal-side interface 303 (Step S402).

Generally, a message of this connection request includes information representing the user name and password. The computer 301 can check whether the user of the terminal 111 having sent this connection request is a proper user having "using right" for connection, using the information.

Next, the CPU 302, checks whether the received connection request is a proper request (Step S403). As descried above, in this embodiment, the CPU 302 authenticates the user of the terminal using the user name and password included in the message of the connection request.

For example, a well-known one-way hash function, such as MD5, DES, etc., using a predetermined character string as a salt, is adopted for a character string of the password. The CPU 302 determines whether a result of the has function is the same as that calculated in advance in association with the user, so as to check the user.

As will be described later, when to check the user, the user may have to input a different password every time the user inputs the password, and the CPU 302 may check the user based on the input password.

In the case where the connection request is a proper request (Step S403; YES), the CPU 302 assigns the terminal 111 a currently-unused IP address as a communications identifier (Step S404), and stores the user name in association with the assigned IP address in the hard disk 305 or RAM 307 (Step S405), so as to complete the present process.

The terminal 111 receives the IP address as a communications identifier (Step S406), to get ready for subsequent communications. In the case where the terminal 111 sends various messages, such as a service-request message, etc:, to the ASP 132 in the Internet, the terminal 111 uses this communications identifier as a sender IP address.

In the case where the connection request is not a proper request (Step S403; NO), the CPU 302 refuses the connection request (Step S407). The present process is terminated. For the sake of easy understanding, the response from the terminal 111 with respect to the refusal in the step S407 is not shown in the illustration.

In this manner, the user name and the assigned communications identifier are stored in association with each other, thereby the CPU 302 can know who the user of the terminal 111 is, based on the sender or communications identifier of the addressee which are included in the message.

Subsequently, the communications between the terminal 111 and the ASP 132 in the Internet 131 is performed, if the ISP 151 relays and transmits a message including the IP address as the sender and the IP address as the communications identifier of the addressee.

The ISP 151 executes a process for relaying a message from a certain ASP 132 in the Internet 131 to another ASP 132 in the Internet, with a well-known bucket-brigade communications technique using TCP/IP.

In the case where between the terminal 111 and the ISP 151 is disconnected, the communications identifier assigned to the terminal 111 has no validity, and a pair of the user name and its corresponding communications identifier stored in the step S405 are erased. By this, in the case where a connection request is sent from any other terminal 111, a communications identifier which is not used at that time can be reused.

(Terminal-Side Relay Process)

Figure 7:
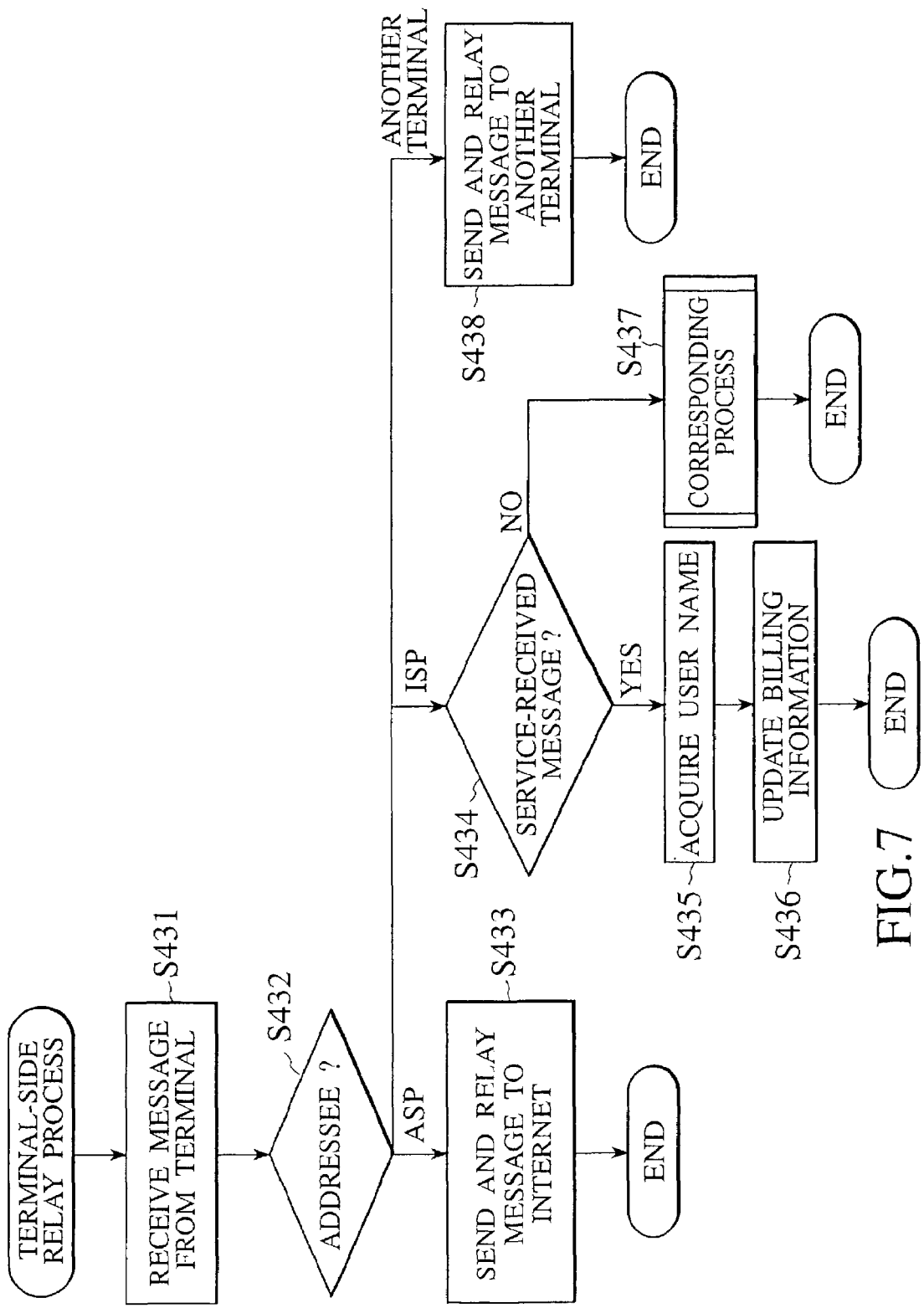
FIG. 7 is a flowchart showing the flow of a terminal-side relay process carried out by the relay device of the present invention.

FIG. 7 is a flowchart showing the state of a terminal-side relay process which is executed by the ISP 151 (the computer 301, the relay device 351). The present process is activated upon detection of arrival of any of various messages from the terminal 111. Description will now be made with reference to FIG. 7.

First, the computer 301 receives a message from the terminal-side interface 303 (Step S431). The received message is temporarily stored in the RAM 307.

The CPU 302 checks the addressee of the message (Step S43). In the case where the addressee is the ASP 132 in the Internet (Step S432; ASP), the CPU 302 sends the message to the Internet 131 through the communications-network-side interface 304 (Step S433), so as to complete the present process. Such a message may include a service-request message.

In the case where the addressee is the ISP 151 (Step S432; ISP), the CPU 302 checks whether the message is the service-received message (Step S434). In the case where the message is the service-received message (Step S434; YES), the CPU 302 acquires the user name from information: such as an IP address of the terminal 111 which is written in the service-received message, including an IP address (the IP address of the terminal 111) of the sender of the service-received message; a MAC (Media Access Control) address of the network interface of the terminal 111 used by that user, etc. (Step S435). The CPU 302 stores billing information included in the service-providing message which has previously been relayed to the terminal 111 or the billing information written in the service-received message, additionally in the billing-information storage section 360 in the hard disk 305 so as to update the storage section S436), thus completing the present process.

On the contrary, in the case where the message is not the service-received message (Step S434; NO), the CPU 302 executes a process corresponding to its contents (Step S437), so as to complete the present process.

In the case where the message is addressed to another terminal 111 (Step S432; Another Terminal), the CPU 302 sends the message to the addressee through the terminal-side interface 303 (Step S438), so as to complete the present process.

(Communications-Network-Side Relay Process)

Figure 8:
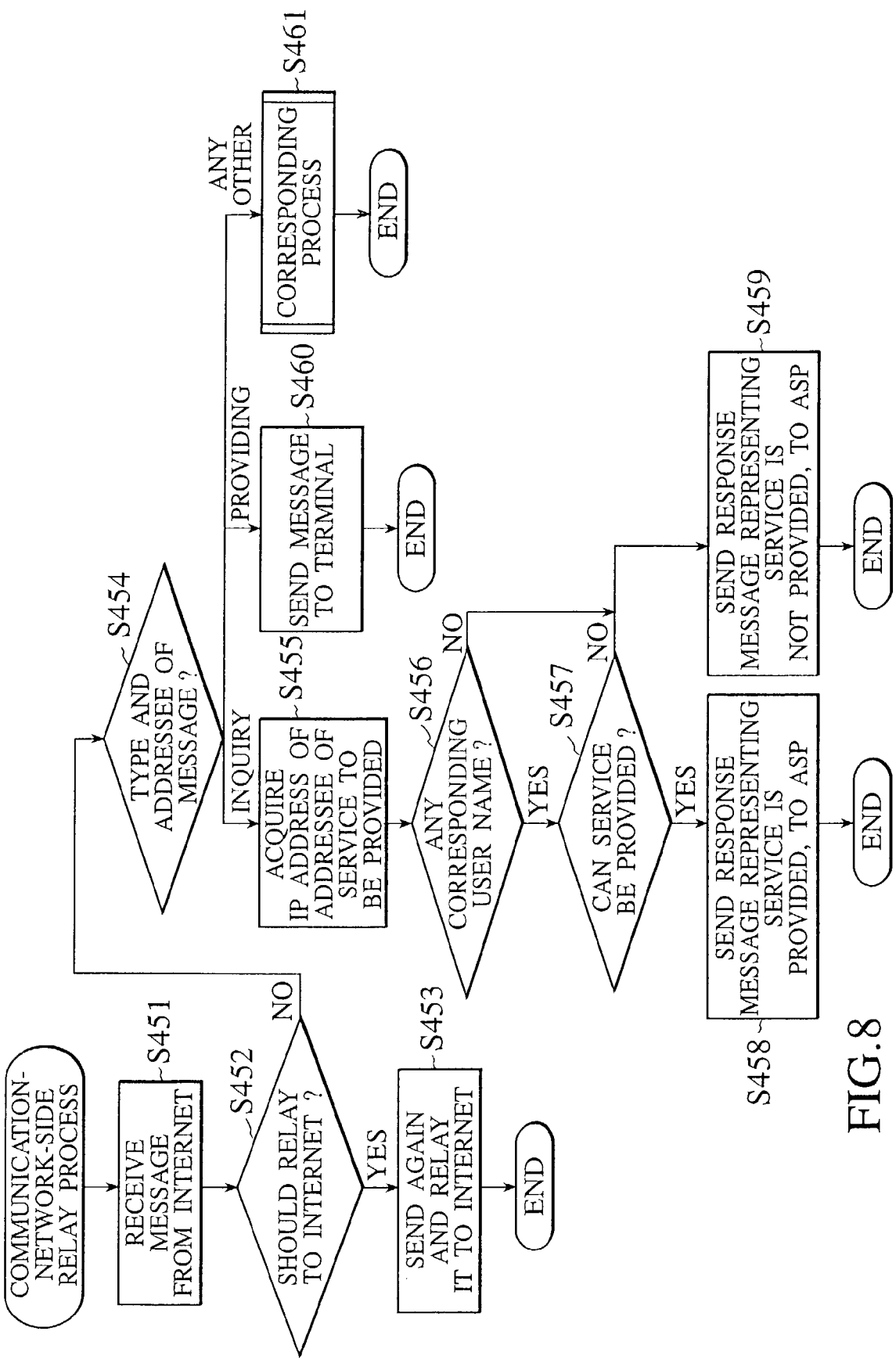
FIG. 8 is a flowchart showing the flow of a communications-network-side relay process carried out by the relay device of the present invention.

FIG. 8 is a flowchart showing the state of a communications-network-side relay process carried out by the ISP 151 (the computer 301, the relay device 351). The present process is activated upon detection of arrival of any of various messages from the Internet 131. Description will now be made with reference to FIG. 8.

The computer 301 receives the message through the communications-network-side interface 304 (Step S451). The received message is temporarily stored in the RAM 307.

The CPU 302 determines whether the message should be sent to another device in the Internet 131, i.e. whether it should relays the message to send again the message to the Internet 131 (Step S452). In the case where the message should be so sent (Step S452; YES), the CPU 302 relays and sends again the message to the Internet 131 through the communications-network-side interface 304 (Step S453), so as to complete the present process.

In the case where the message should not be so sent (Step S452; NO), i.e. in the case where the message is addressed to the ISP 151 or to the terminal 111, the CPU 302 examines the addressee and type of the message (Step S454).

In the case where the message is an inquiry message and addressed to the ISP 151 (Step S454; Inquiry), the CPU 302 acquires an IP address of the addressee of the service which is specified in the inquiry message (Step S455).

Next, the CPU 302 examines whether this IP address is assigned to a user of any one terminal 111 (Step S456). In the case where the CPU 302 could acquire the user name of the terminal 111 to which the IP address is assigned (Step S456; YES), the CPU 302 checks whether the service can be provided to the user of the corresponding user name (Step S457). In the case where the service can be provided thereto (Step S457; YES), the CPU 302 sends a response message indicating that the service is to be provided thereto, to the ASP 132 through the communications-network-side interface 304 (Step S458), so as to complete the present process.

In the case where the CPU 302 could not acquire the user name (Step S456; NO), or in the case where the service can not be provided (Step S457; NO), the CPU 302 sends a response message indicating that the service is not be provided, to the ASP 132 through the communications-network-side interface 304 (Step S459), so as to complete the process.

In the case where the message is a service-providing message and the addressee is one terminal 111 (Step S454; Providing), the CPU 302 sends this message to the addressee terminal 111 through the terminal-side interface 303 (Step S460), so as to complete the present process.

In the case where the message is one other than the above (Step S454; Any other), the CPU 302 executes a corresponding process (Step S461), so as to complete the present process.

Determination as to whether a service can be provided in the step S457 may be performed based on criteria as follows:
 the service may always be provided;
 the service may be provided, in the case where the service charge of the corresponding service is equal to or less than the maximum charge for the user, while setting billing information for this corresponding service to be included in the inquiry message;
 the service may be provided, in the case where the charge is equal to or less than the balance assigned to the user with respect to "access right" within a predetermined period of time, while setting the billing information for the corresponding service to be included in the inquiry message; and
 the service may be provided, in the case where the type of the service is a predetermined type (e.g. any service other than "a service for adjusts").

Such criteria for providing the service may be changed in accordance with the contract made between the user and the ISP 151. The user may access the ISP 151 from the terminal 111, and change the above criteria using a CGI (Common Gateway Interface) script of the ISP 151.

In the case where the billing information is included in the service-providing message or inquiry message, the billing information of the corresponding user may e updated upon reception of such billing information. The billing information may once temporarily be updated, and then completely updated, upon reception of the service-received message from the terminal 111 of the corresponding user.

(Another Embodiment of Connection-start Process)

The present invention is mainly the same as the above-described embodiment, however, employs a different authentication process in the connection-start process from that of the above-described embodiment.

Figure 9:
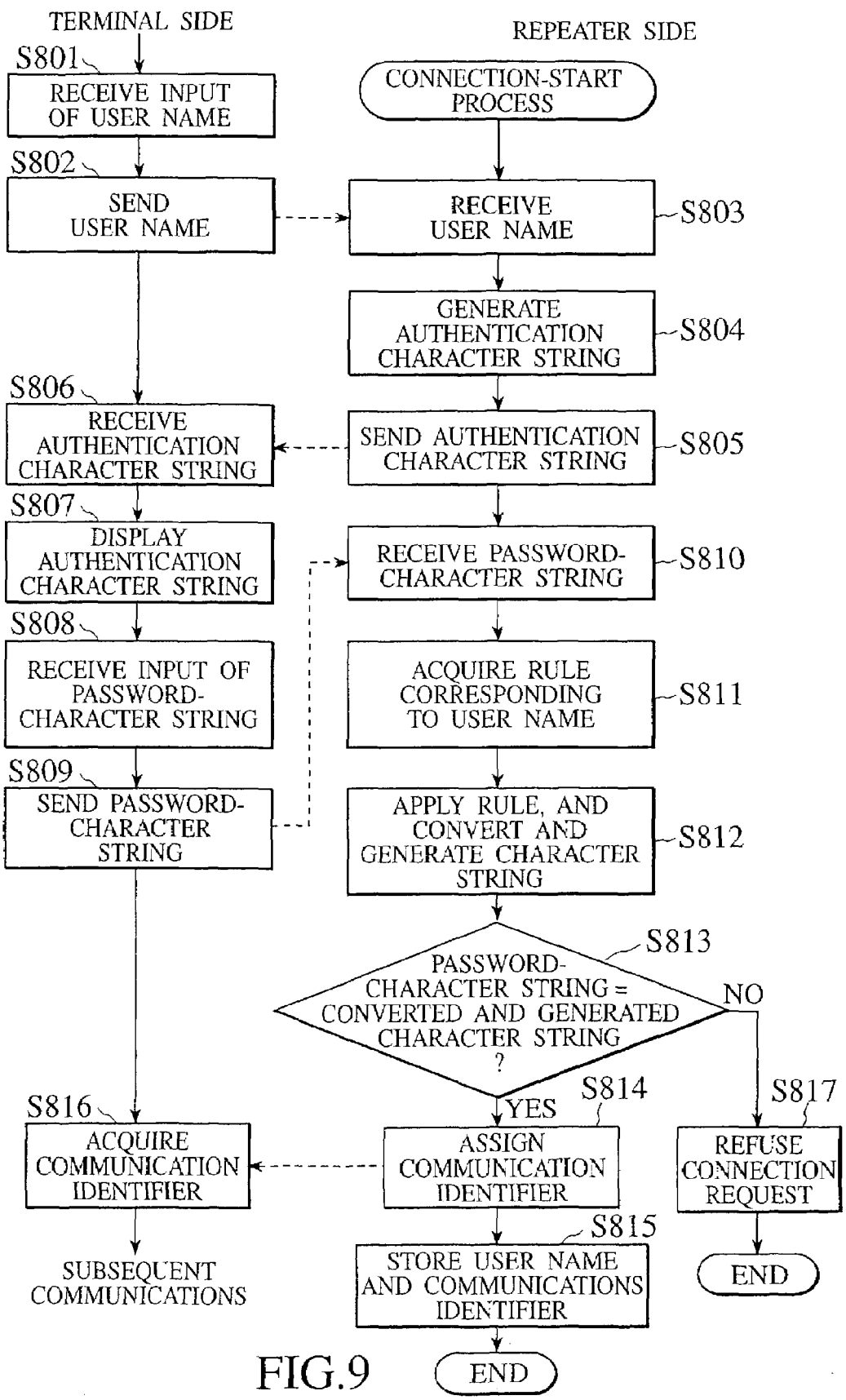
FIG. 9 is a flowchart showing the flow of a connection-start process carried out by the relay device of the present invention.

FIG. 9 is a flowchart showing the flow of a connection-start process in the present invention. Description will now be made with reference to FIG. 9. In FIG. 9, a process executed by the terminal 1111 is shown in combination with the connection-start process executed by the ISP 151 (the relay device 351).

The terminal 111 receives an input of the user name from the user (Step S801), and sends a connection request together with the user name to the ISP 151 (Step S802).

Upon reception of the connection request (S803), the ISP 151 generates an authentication character string using random numbers (Step S804), and sends the generated authentication character string to the terminal 111 (Step S805).

The terminal 111 receives the authentication character string (Step S806), and displays the received authentication character string on a display (Step S807).

The user converts the displayed authentication character string into a password-character string based on a rule, which is set in advance for the user. This rule is stored in the hard disk 305 of the ISP 151 in association with the user name. This conversion will be explained later.

The terminal 111 accepts the input of the password-character string input by the user (Step S808), and sends the password-character string to the ISP 151 (Step S809).

The ISP 151 receives this password-character string (Step S810).

The ISP 151 acquires the rule stored in the hard disk 305 in association with the user name (Step S811), and applies this rule for the authentication character string generated in the step S804, so as to convert and generate the character string (Step S812).

Further, the ISP 151 compares and determines whether the password-character string received in the step S810 and the character string converted and generated in the step S812 are the same (Step S813).

In the case where these character strings are the same (Step S813;YES), the connection request is a proper request. The ISP 151 assigns the terminal 111 a currently-unused communications identifier (Step S814). The ISP 151 stores the corresponding user name in association with the provided communications identifier, in the hard disk 305 or the RAM 307 (Step S815), so as to complete the present process. The terminal 1111 acquires the provided communications identifier (Step S816), to get ready for further communications.

In the case where the two character strings are not the same (Step S813; NO), i.e. in the case where the connection request is not a proper request, the ISP 151 sends information indicating that the connection request is refused, to the terminal 111 (Step S817), so as to complete the present process. For the sake of easy understanding, the response from the terminal 111 with respect to this information is not shown in the illustration.

As the rule to be employed in this embodiment, the following rules may be adopted.

The authentication character string is a string of an "n" number of digits, while the password-character string is a string of an "m" number of digits. It is ruled that the numeral of the "k"-th ($1 \leq k \leq m$) digit in the password-character string can be obtained, by adapting a predetermined calculation operation, such as addition, subtraction, multiplication or division with respect to the "$h_k$"-th ($1 \leq h_k \leq n$) digit in the authentication character string. The value "$h_k$" and its association calculation may be different for each user, so as to perform the authentication.

For example, in the case where n=8 and m=3, a rule "a sum of the second digit and two, a sum of the fourth digit and two, and a sum of the sixth digit to three" is given to a certain user. To another user, a rule "a product of the first digit and three, the remainder of division of the eighth digit by four, and the difference between the fifth digit and three" is given (Note that only the first digit of the above-described calculation result is employed). For example, in the case where the former rule is used, a proper password-character string with respect to the authentication character string "18245924" is "962".

As the authentication character string, a string including an English letter(s) or Japanese character(s) may be used. In this case, a calculation of "following character", "preceding character", "change to small letter", "change to capital letter" or "obtain vowel", may be used. Other than this, as disclosed in Unexamined Japanese Patent Application KOKAI Publication No. H10-307799, a predetermined calculation disk may be used.

In this embodiment, each section of the computer 301 serves likewise that described in the above-described embodiment. In this embodiment, the CPU 302 serves as an authentication-character-string generator/sender, the terminal-side interface 303 serves as a password-character-string receiver, and a medium installed in the hard disk 305 or the medium reader 310 serves as a rule storage section.

In the case where the user wants to use the billing service provided by the present invention after the user has once established the connection using a conventional password formation technique, the service can be handled by executing the same process as the above-described connection-start process. That is, the CPU 302 compares the authentication character string and the password-character string sent from the corresponding user, in accordance with the user's rule. In the case where successful authentication is made, the provided IP address is maintained as is. In the case where successful authentication is not made, the provided IP address gets invalidated. In this case, the CPU 302 serves as the above-described communications-identifier invalidating section.

In this embodiment, when providing connection toward the Internet 131, it is preventable that the real password-character string itself is input using the terminal 111.

By this, for example, even if the terminal 111 is infected with a computer virus, for stealing the input password through monitoring its dial-up connection, successful authentication can not be made without the rule. Thus, high-security connection to the Internet 131 can be provided to the user.

(Service Provider)

Figure 10:
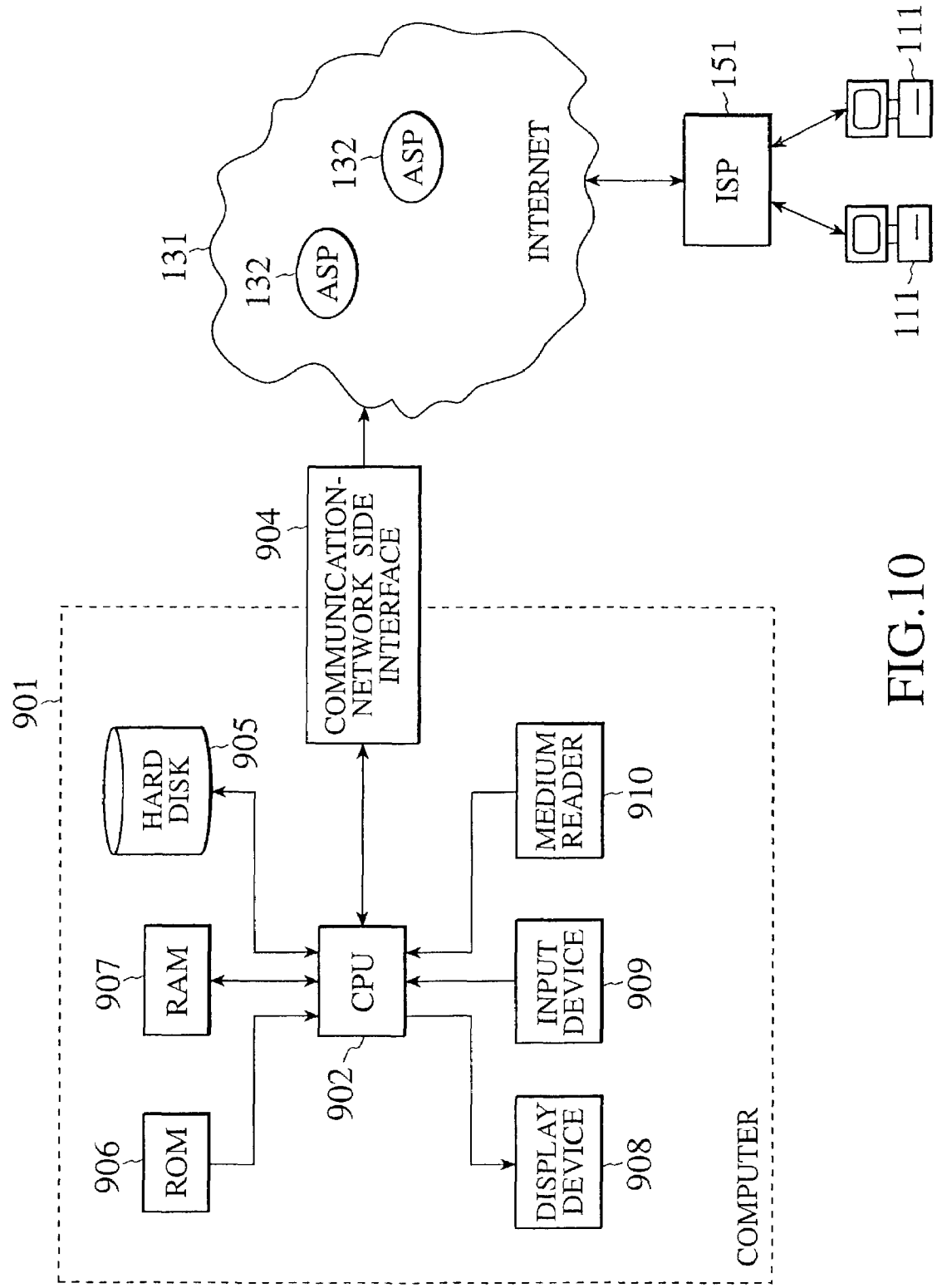
FIG. 10 is an exemplary diagram showing the schematic structure of a computer serving as a service provider of the present invention.

FIG. 10 is an exemplary diagram showing the schematic structure of a computer for realizing the ASP serving as a service provider of the present invention. Description will now be made with reference to FIG. 10.

Each section of the computer 901 is controlled by a CPU 902. Communications with each device, such as other ASPs 132 in the Internet 131, or the ISP 151, etc. can be made through a communications-network-side interface 904. As the communications-network-side interface 904, any of various network interface cards can be used.

Upon activation of the computer 901, the CPU 902 executes an IPL program stored in a ROM 906. The IPL program includes an instruction for: writing a program stored in a predetermined location of a hard disk 905 into a RAM 907; and executing the read program. By this process, any of various OS or a program for controlling the computer 901 to serve as an ASP can operate on the computer 901.

The CPU 902 uses the RAM 907 as a buffer for temporarily storing a message, when relaying or processing the message.

The hard disk 905 to be providing data to the terminal 111 stores data regarding services. In the case where a service is for image information, voice information, etc., the hard disk 905 stores such information in the form of a file. In the case where to provide a service for mail-order selling, the hard disk 905 stores information regarding each product.

Other than this, the computer 901 may include a display device 908, such as a CRT display, etc. or an input device 909, such as a keyboard, a mouse, etc. The administrator of the relay device sets the structure of the computer 901 or administers the computer 901 using the above devices.

The computer 901 may include a medium reader 910, such as a CD-ROM drive, an FD drive, etc. for installing a program into the computer 901. A program or data for services to be provided can be installed into the hard disk 905 from a medium, such as a CD-ROM, FD, etc. The program stored in any device in the Internet 131 may be installed into the hard disk 905.

The ASP 132 and the ISP 151 may be realized as a computer which can be controlled by a group of programs having similar functions. Thus, instead of the computer 901 shown in FIG. 10, with the computer 301 shown in FIG. 3, both functions of the ASP 132 and the ISP 151 may be accomplished.

Figure 11:
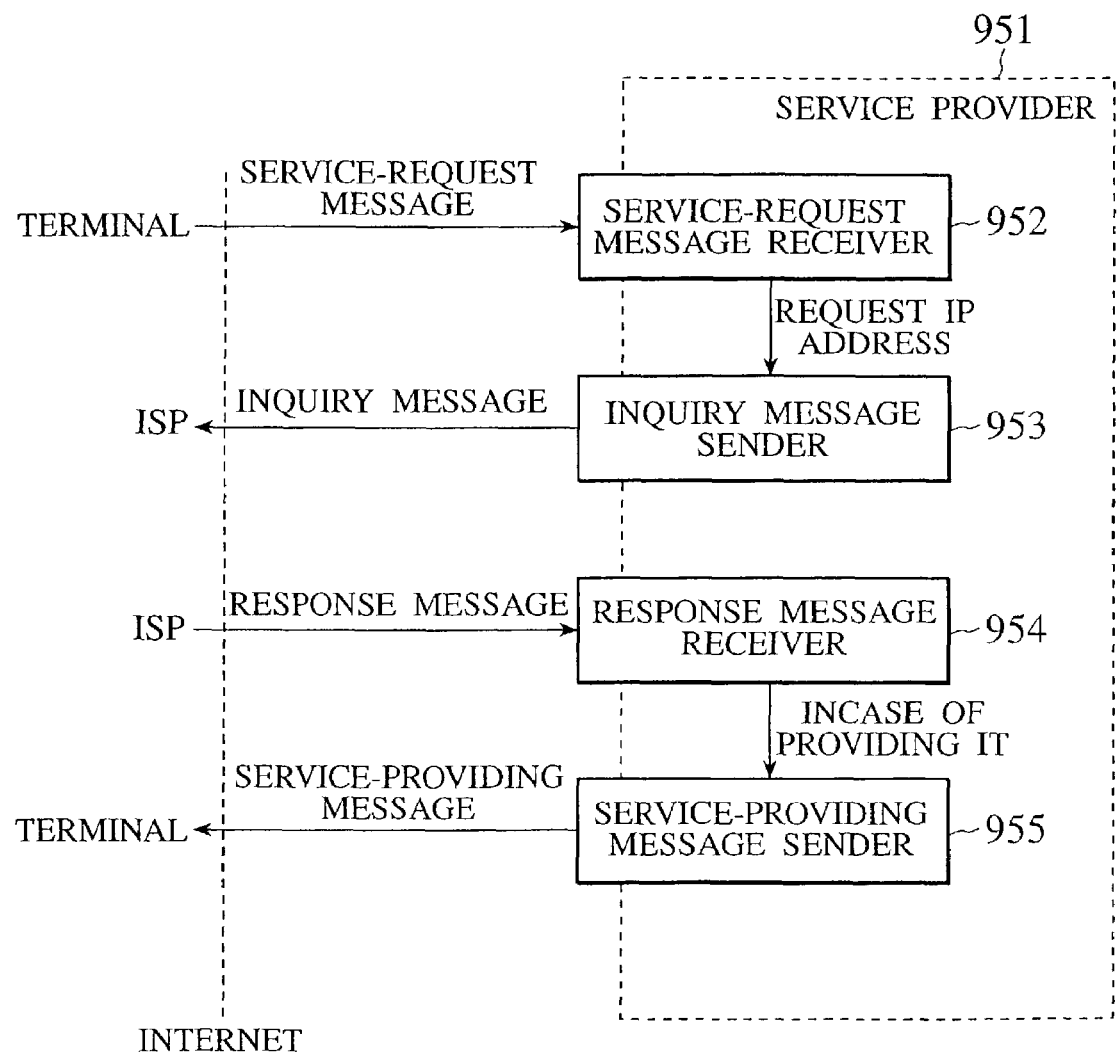
FIG. 11 is an exemplary diagram showing the schematic structure of the service provider of the present invention.

FIG. 11 is an exemplary diagram showing the schematic structure of a service provider of the present invention. With reference to FIGS. 10 and 11, the correspondence between each section of the ASP 132 and the service provider will be described.

A service-request-message receiver 952 of a service provider 951 receives a service-request message of a sender having an IP address of the terminal 111, from the ISP 151. Thus, the communications-network-side interface 904 serves as the service-request-message receiver 952.

An inquiry-message sender 953 sends an inquiry message for inquiring whether to provide a service to the terminal 111 specified in the service-request message, to the ISP 151. The inquiry message is generated by the CPU 902 in the RAM 907, and sent by the communications-network-side interface 904.

Further, a response-message receiver 954 receives a response message specifying whether to provide a service, from the ISP 151. Thus, the communications-network-side interface 904 serves as the response-message receiver 954.

A service-providing-message sender 955 sends a service-providing message addressed to the terminal 111 to the ISP 151, in the case where the response message specifies that a service is provided. This service-providing message is generated by the CPU 902 in the RAM 907 using information stored in the hard disk 905, and sent by the communications-network-side interface 904.

(ASP Process)

Figure 12:
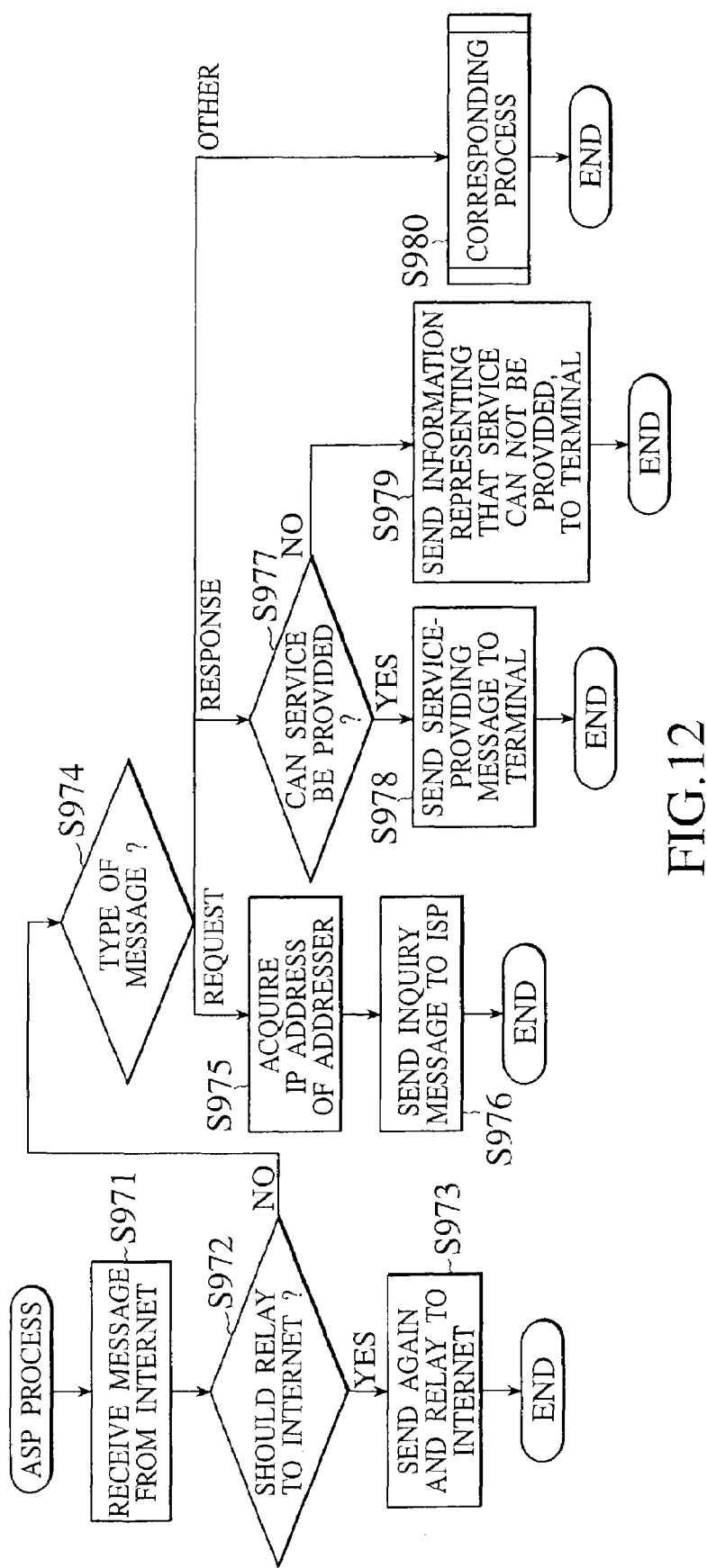
FIG. 12 is a flowchart showing the flow of an ASP process carried out by the service provider of the present invention.

FIG. 12 is a flowchart showing the flow of an ASP process executed by the computer 901 serving as the ASP 132 (the service provider 951). This process is activated, upon detection of arrival of any of various messages at the communications-network-side interface 904. Description will now be made with reference to FIG. 12.

The computer 901 receives a message through the communications-network-side interface 904 (Step S971). The received message is temporarily stored in the RAM 907.

Next, the CPU 902 checks whether the message is one that should be sent to another device in the Internet 131 (including its LAN (Local Area Network) in the case where the ASP 132 serves as a gateway), i.e. whether the message is one that should be relayed to be sent aging to the Internet 131 (Step Said). In the case where the message should be so sent (Step Said; YES), the CPU 902 relays and sends the message again to the Internet 131 through the communications-network-side interface 904 (Step S973), so as to complete the present process.

In the case where the message should not be so sent (Step S972; NO), that is, in the case where the message is addressed to the ASP 132, the CPU 902 checks the type of the message (Step S974).

In the case where the message is a service-request message (Step S974; Request), the CPU 902 acquires an IP address of the terminal 111 to which a service is provided and which is specified in the service-request message, i.e. an IP address of the terminal 111 having sent the message (Step S975).

Next, the CPU 902 sends an inquiry message for inquiring whether a service can be provided to the terminal 111, to the ISP 151 through the communications-network-side interface 904 (Step S976), so as to complete the present process.

In the case where the message is a response message (Step S974; Response), the CPU 902 examines the message, and checks whether a service can be provided to the terminal 111 (Step S977). In the case where a service can be provided to the terminal 111 (Step S977; YES), the CPU 902 sends a service-providing message to the terminal 111 through the communications-network-side interface 904 and the ISP 151 (Step S978), and thus completing the present process.

In the case where the service can not be provided to the terminal 111 (Step S977; NO), the CPU 902 sends information representing that the service can not be provided thereto, to the terminal 111 through the communications-network-side interface 904 and the ISP 151 (Step S979), so as to complete the present process.

In the case where the message is any message other than the above (Step S974; Other), the CPU 902 executes a corresponding process (Step S980), so as to complete the present process.

(Embodiment of Messages)

To smoothly execute the above-described processes between the ISP 151 and the ASP 132, it is preferred that the following information is specified in both of the inquiry message and the response message.

Such information includes:

an IP address of the terminal 111 requesting a service; and the type of the service, the service charge, any conditions for providing the service, etc.

If the ISP 151 receives the inquiry message, the CPU 902 generates a response message including a copy of the information, and sends the generated response message to the ASP 132.

The ASP 132 affixes a non-repetitive identifier (a service-providing number) to the service-request message received by the ASP 132. The ASP 132 may use the identifier from one message to another among the inquiry message, the response message and the service-received message. If such information is specified in both messages, the consistency of various messages can be checked.

(Application of Mail-Order Selling)

In the above explanations, explanations have been made to the embodiment for providing information contents (image information, voice information, etc.) including electronic information in a service. If the following embodiment is adopted, the present invention can be employed for Internet-order selling.

That is, the user is asked to input not only a product name of a desired product, but also address for delivery (generally, it's the user address, but any other address can be specified), and the input information is specified in a service-request message. In the inquiry message or service-providing message, the product name or the price of the product is specified. The user receives the service-providing message as "duplicate copy of order selling". The ASP 132 sends an instruction for delivering the product to a product-delivery center, upon billing the user for the product in the ISP 151.

In this embodiment, information regarding the address for delivery for product is transmitted to the Internet 131. According to the present invention, personal information, such as the address for delivery (generally the user address), etc. can be prevented from being transmitted to the Internet 131.

That is, if the user orders the ASP 132 for a product to be purchased, the ASP 132 affixes a reference number to the order. The ASP 132 sends the reference number affixed to the order and information about the price of the ordered product to the ISP 151, and bills the user for the ordered product.

The ASP 132 sends the reference number, the product name and the number of the product(s) ordered, to a product management company. The product management company packs the ordered product(s), attaches the reference number to the package, and sends the product to the delivery center.

On the other hand, the ISP 151 sends information regarding the user address corresponding to the reference number, to the delivery center.

The delivery center focuses the address for delivery based on the information sent from the ISP 151, and delivers the ordered product thereto.

In this manner, the present invention can be adopted for the embodiment, wherein transmission of the personal information is limited as much as possible.

The above explanations have been made to the embodiment, wherein the billing is performed when the ASP 132 in the Internet provides the terminal 111 with a service through the ISP 151. However, the present invention is not limited to this. The present invention can be adopted to any other embodiment, wherein communications identifiers are assigned respectively to communications devices, through various computer communications networks, and such an embodiment is included in the present invention.

(Another Embodiment of Relay Device)

Figure 13:
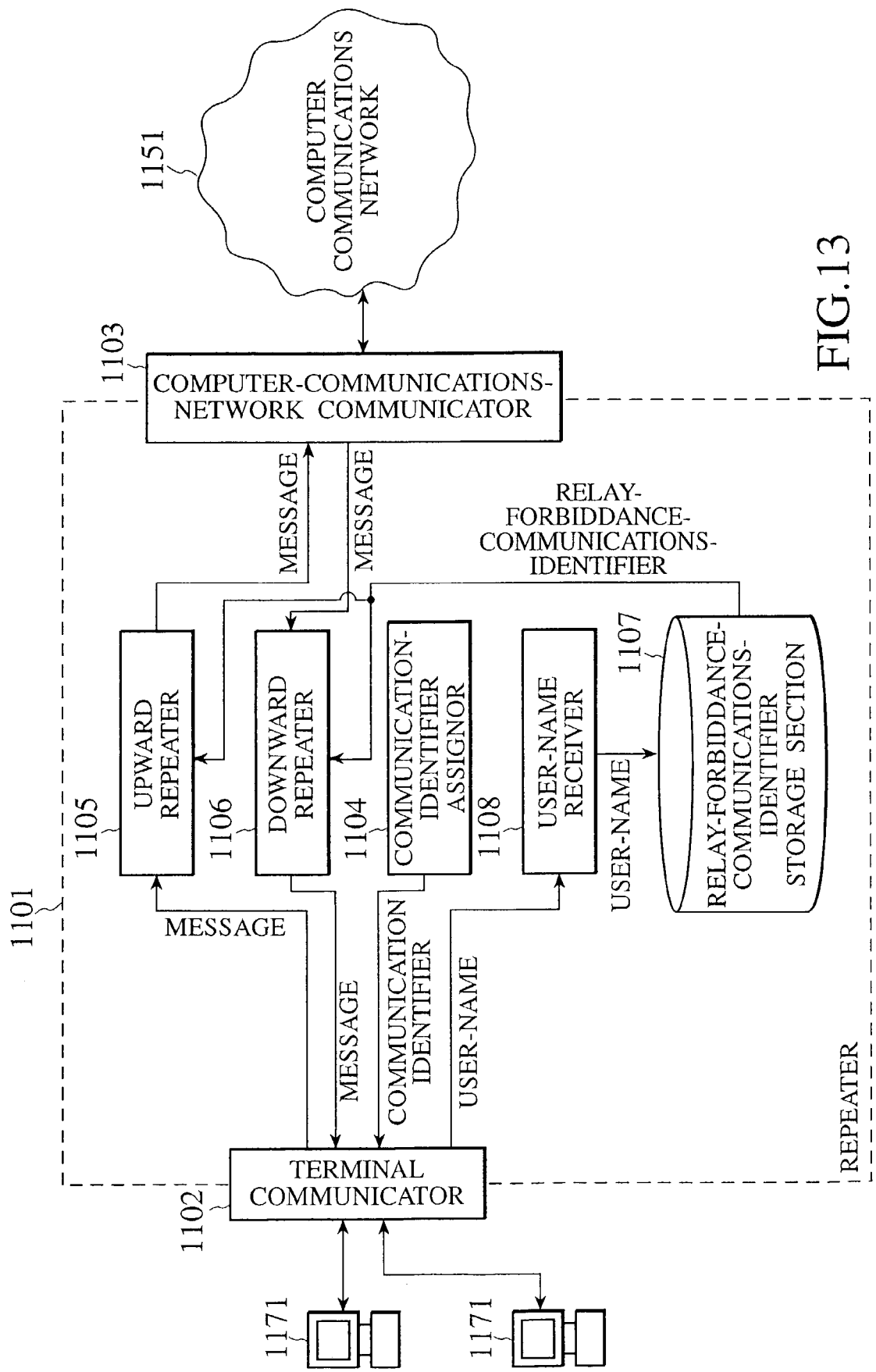
FIG. 13 is an exemplary diagram showing the schematic structure of a relay device of another embodiment of the present invention.

FIG. 13 is an exemplary diagram showing the schematic structure of a relay device of another embodiment of the present invention. Description will now be made with reference to FIG. 13.

As shown in FIG. 13, a relay device 1101 relays a message including information specifying a communications identifier of the addresser and a communications identifier of the addressee, to a computer communications network 1151 to be communicating therewith. The relay device 1101 includes a terminal-communicator 1102, a computer-communications-network communicator 1103, a communications-identifier assignor 1104, and an upward relay device 1105.

The terminal-communicator 1102 is connected to a terminal 1171, and communicates messages with the terminal 1171.

The computer-communications-network communicator 1103 is connected to the computer communications network 1151, and communicates messages with the computer communications network 1151.

Further, the communications-identifier assignor 1104 assigns the terminal 1171 with a communications identifier.

In the case where: a communications identifier of an addresser, which is specified in information included in a message sent from the terminal 1171 through the terminal-communicator 1102, is the communications identifier assigned by the communications-identifier assignor 1104; and a communications identifier of an addressee, which is specified in the information included in this message, satisfies a relay condition, the upward relay device 1105 sends and relays this message to the computer communications network 1151 through the computer-communications-network communicator 1103. In the case where the relay condition is not satisfied, the upward relay device 1105 does not send the message thereto.

The relay device 1101 includes a downward relay device 1106.

In the case where: a communications identifier of an addressee which is specified in information included in a message sent from the computer-communications network 1151 through the computer-communications-network communicator 1103 is a communications identifier assigned by the communications-identifier assignor 1104; and a communications identifier which is specified in the information included in this message satisfies a relay condition, the downward relay device 1101 sends and relays this message to the terminal 1171 through the terminal-communicator 1102.

On the contrary, in the case where the relay condition is not satisfied, the downward relay device 1106 does not send the message to the terminal 1171. In the case where the addressee of this message is a device in the computer-communications network 1151, the downward relay device 1106 sends this message to the device in the computer-communications network 1151 in a bucket-brigade manner.

The relay device 101 of the present invention may further include a relay-forbiddance-communications-identifier storage section 1107.

The relay-forbiddance-communications-identifier storage section 1107 stores communications identifiers, in advance.

The relay condition is satisfied, in the case where the communications identifier of the addressee or addresser which is specified in the information included in the message is not included in the communications identifiers stored in advance in the relay-forbiddance-communications-identifier storage section 1107.

The relay device 1101 of the present invention may further include a user-name receiver 1108.

The user-name receiver 1108 receives the user name sent from the terminal 11017 through the terminal-communicator 1102.

The relay-forbiddance-communications-identifier storage section 1107 stores in advance the communications identifier(s) in association with the user name(s) received by the user-name receiver 1108.

Further, the relay condition is satisfied, in the case where the communications identifier of the addressee or addresser which is specified in the information included in the message is not included in the communications identifier(s) stored in advance in the relay-forbiddance-communications-identifier storage section 1107, in association with the user name.

Figure 14:
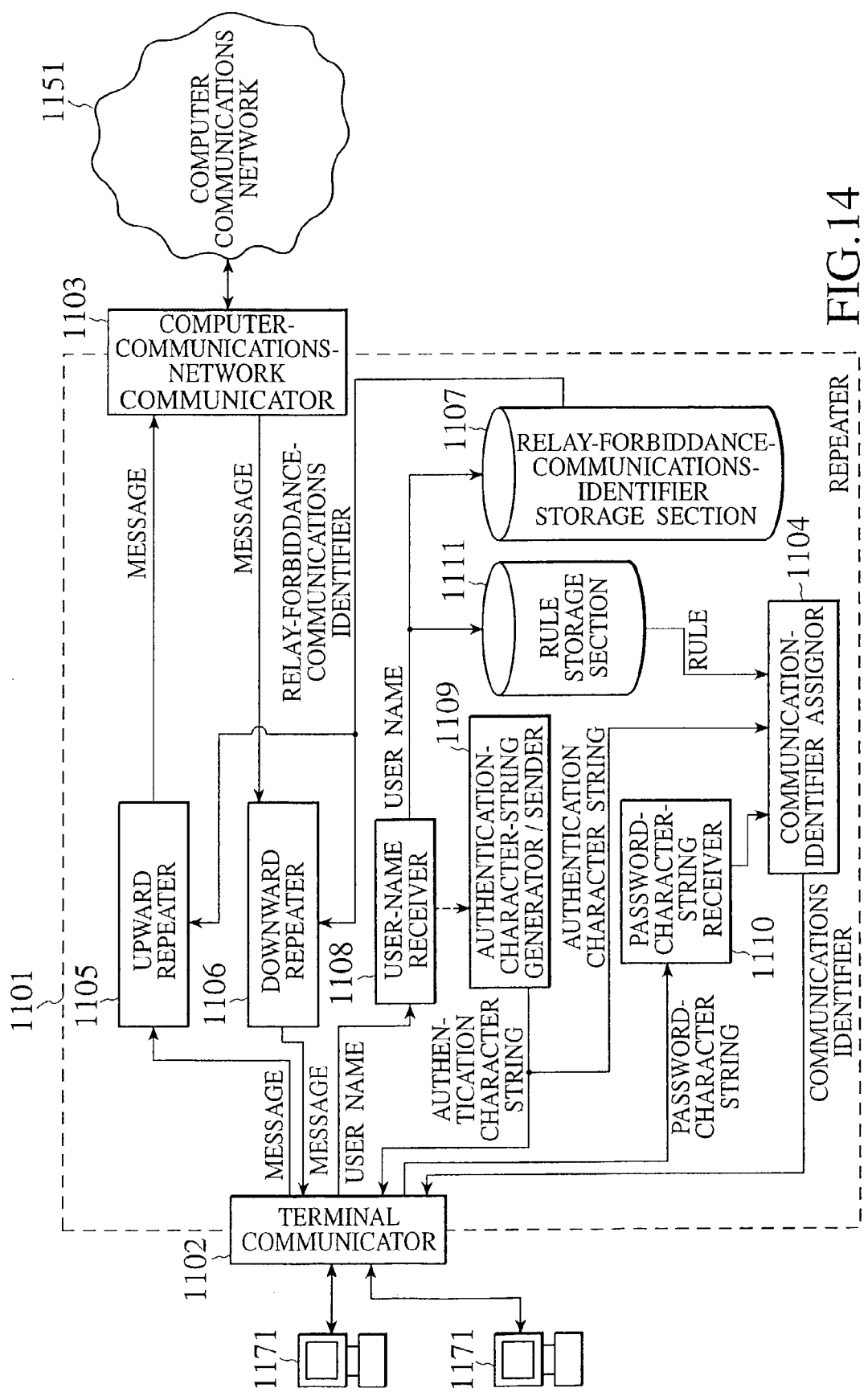
FIG. 14 is an exemplary diagram showing the schematic structure of a relay device of still another embodiment of the present invention.

FIG. 14 is an exemplary diagram showing the schematic structure of a relay device of still another embodiment of the present invention. Description will now be made with reference to FIG. 14. In FIG. 14, the same reference numerals are affixed to the elemental components having the same functions as those shown in the above illustration.

As illustrated in FIG. 14, the relay device 1101 according to this embodiment further includes an authentication-character-string generator/sender 1109, a password-character-string receiver 1110, and a rule storage section 1111, in addition to above-described relay device.

The user-name receiver 1108 of the relay device 1101 receives the user name sent from the terminal 1171, through the terminal-communicator 1102.

The authentication-character-string generator/sender 1109 generates an authentication character string, and sends the generated character string to the terminal 1171 through the terminal-communicator 1102.

The password-character-string receiver 1110 receives the password-character string sent from the terminal 1171 through the terminal-communicator 1102.

The rule storage section 1111 stores a rule for generating a password-character string from the authentication character string, in association with each user name.

In the case where a password-character string received by the password-character string receiver 1110 is generated from the authentication character string generated by the authentication-character-string generator/sender 1109, in accordance with a rule stored in the rule storage section 1111 in association with the user name received by the user-name receiver 1108, the communications-identifier assignor 1104 assigns the terminal 1171 a communications identifier.

The relay device 1101 of the present invention may further include a communications-identifier invalidating section (not illustrated).

In the case where the user name is received by the user-name receiver 1108, the communications-identifier assignor 1104 assigns the terminal 1171 a communications identifier.

In the case where a password-character string received by the password-character string receiver 1110 is not generated from the authentication character string generated by the authentication-character-string generator/sender 1109, in accordance with a rule stored in the rule storage section 1111 in association with the user name received by the user-name receiver 1108, the communications-identifier invalidating section invalidates the communications identifier assigned by the communications-identifier assignor 1104 to the terminal 1171.

In this embodiment, the same rule for determining the correspondence relationship between the password-character string and the authentication character string, as that of the above-described embodiment, can be adopted.

In the relay device 101 of this embodiment, the communications-identifier assignor 1104 selects a currently-unused communications identifier, from a plurality of pre-set communications identifiers, and assigns the terminal 1171 the selected identifier.

Explanations will now be made to the correspondence relationship among elemental components in the relay devices of the embodiments shown respectively in FIGS. 13 and 14 and the computer 301 shown in FIG. 3.

The terminal-side interface 303 serves as the terminal-communicator 1102. The communications-network-side interface 304 serves as the computer-communications-network communicator 1103.

The CPU 302 serves as the communications-identifier assignor 1104, serves as the upward relay device 1105 in cooperation with the communications-network-side interface 304, and serves as the downward relay device 1106 in cooperation with the terminal-side interface 303.

The medium installed in the hard disk 305 or the medium reader 310 serves as the relay-forbiddance-communications-identifier storage section 1107.

The terminal-side interface 303 serves as the user-name receiver 1108.

In the case where the computer 301 shown in FIG. 3 serves as the relay device 1101 according to the embodiment shown in FIG. 14, the same connection-start process shown in FIG. 6 can be employed for assigning the terminal 1171 a communications identifier.

Subsequently, communications between the terminal 1171 and the ASP in the computer-communications network 1151 is achieved through communications of a message including their IP addresses and/or port numbers as communications identifiers of the addresser and the addressee. This relay process will be described later, with the description of two separate processes of an upward relay process (data transmission from the terminal 1171 to the ASP in the computer-communications network 1151) and a downward relay process (data transmission from the ASP in the computer-communications network 1151 to the terminal 1171).

For the sake of easy understanding, in the following description of the upward relay process and the downward relay process, no particular explanations will be made to a process, carried out by the computer 301 (the relay device 1101), for relaying messages from a particular ASP in the computer communications network 1151 to another ASP in the computer communications network 1151. For the non-descriptive process, a well-known bucket-brigade communications technique using TCP/IP can be employed.

(Upward Relay Process)

Figure 15:
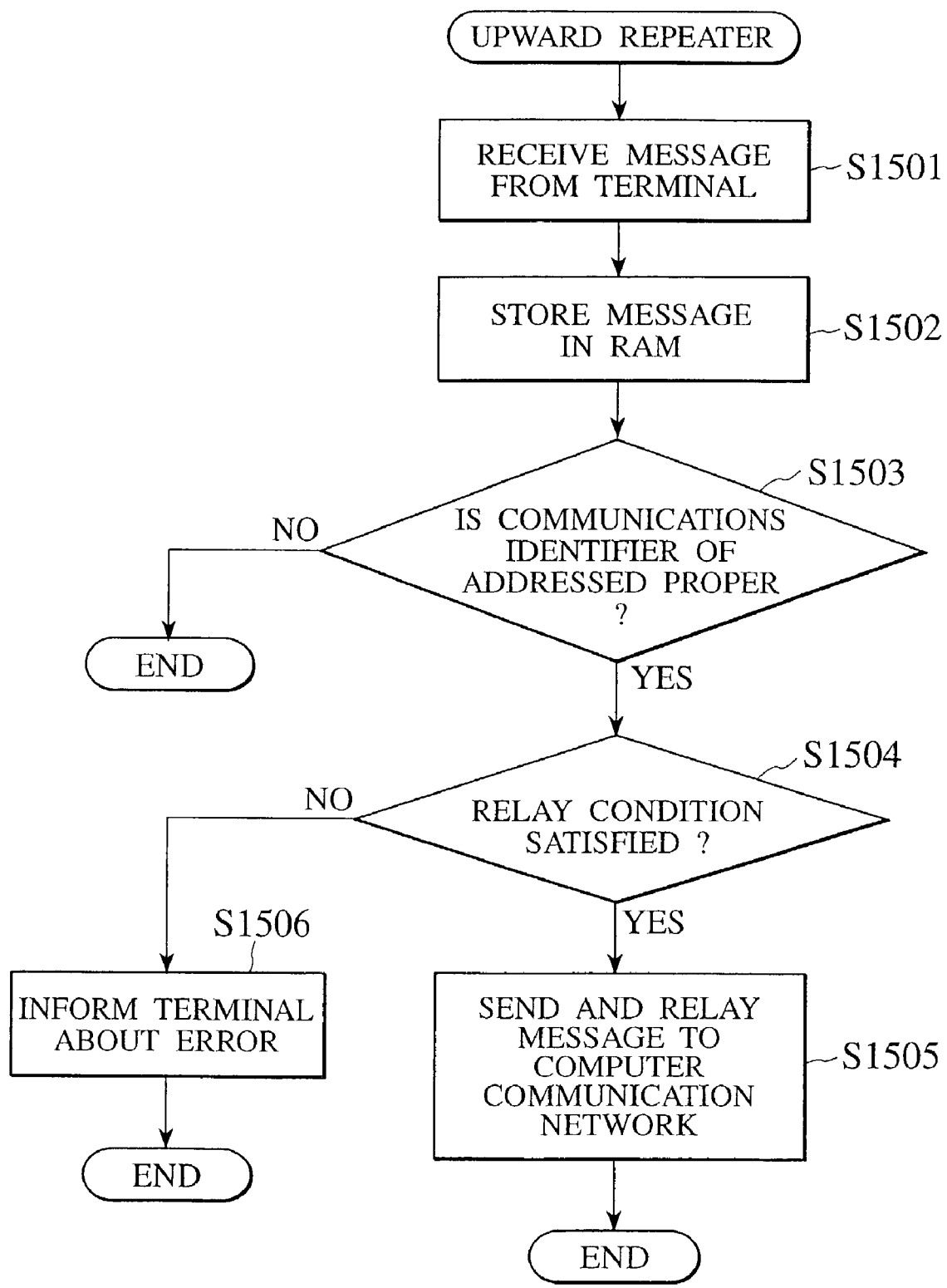
FIG. 15 is a flowchart showing the flow of an upward relay process carried out by the relay device of the present embodiment.

FIG. 15 is a flowchart showing the flow of an upward relay process, wherein the computer 301 shown in FIG. 3 relays a message sent from the terminal 1171 to an ASP in the computer communications network 1151. Description will now be made with reference to FIG. 15.

The upward relay process is activated, if the CPU 302 detects that the message sent from the terminal 1171 has arrived at the terminal-side interface 303.

Upon activation of the upward relay process, the CPU 302 receives the message sent from the terminal 1171 through the terminal-side interface 303 (Step S1501), and temporarily stores the message in a buffer in the RAM 307 (Step S1502).

The CPU 302 checks communications identifiers of the addresser and addressee of the message.

The CPU 302 checks whether the communications identifier of the addresser is a communications identifier assigned to any one terminal in the above-described connection-start process (Step S1503). In the case where the communications identifier of the addresser is not the assigned communications identifier (Step S1503; NO), there is an error in the message, resulting in completing the present process. Note, in this case, a proper communications identifier of the terminal 1171 having sent the message is unknown, so that the terminal 1171 is not informed about the error.

On the contrary, in the case where the communications identifier of the addresser is the assigned communications identifier (Step S1503; YES), the CPU 302 checks whether communications identifier of the addressee satisfies a relay condition (Step S1504).

In this embodiment, the relay condition is satisfied, in the case where any of the communications identifiers (relay-forbiddance communications identifiers) stored in the relay-forbiddance-communications-identifier storage section 1107 in the hard disk 305 does not coincide with the communications identifier of the addressee.

In the case where the relay condition is satisfied (Step S1504; YES), i.e. in the case where the relaying is performed, the computer 301 sends and relays this message to the computer communications network 1151 through the communications-network-side interface 304 (Step S1505), so as to complete the present process.

In the case where the relay condition is not satisfied (Step S1504; NO), i.e. in the case where the relaying is not performed, the computer 301 informs the terminal 1171 of an error that the message can not be relayed thereto (Step S1506), so as to complete the present process.

(Downward Relay Process)

Figure 16:
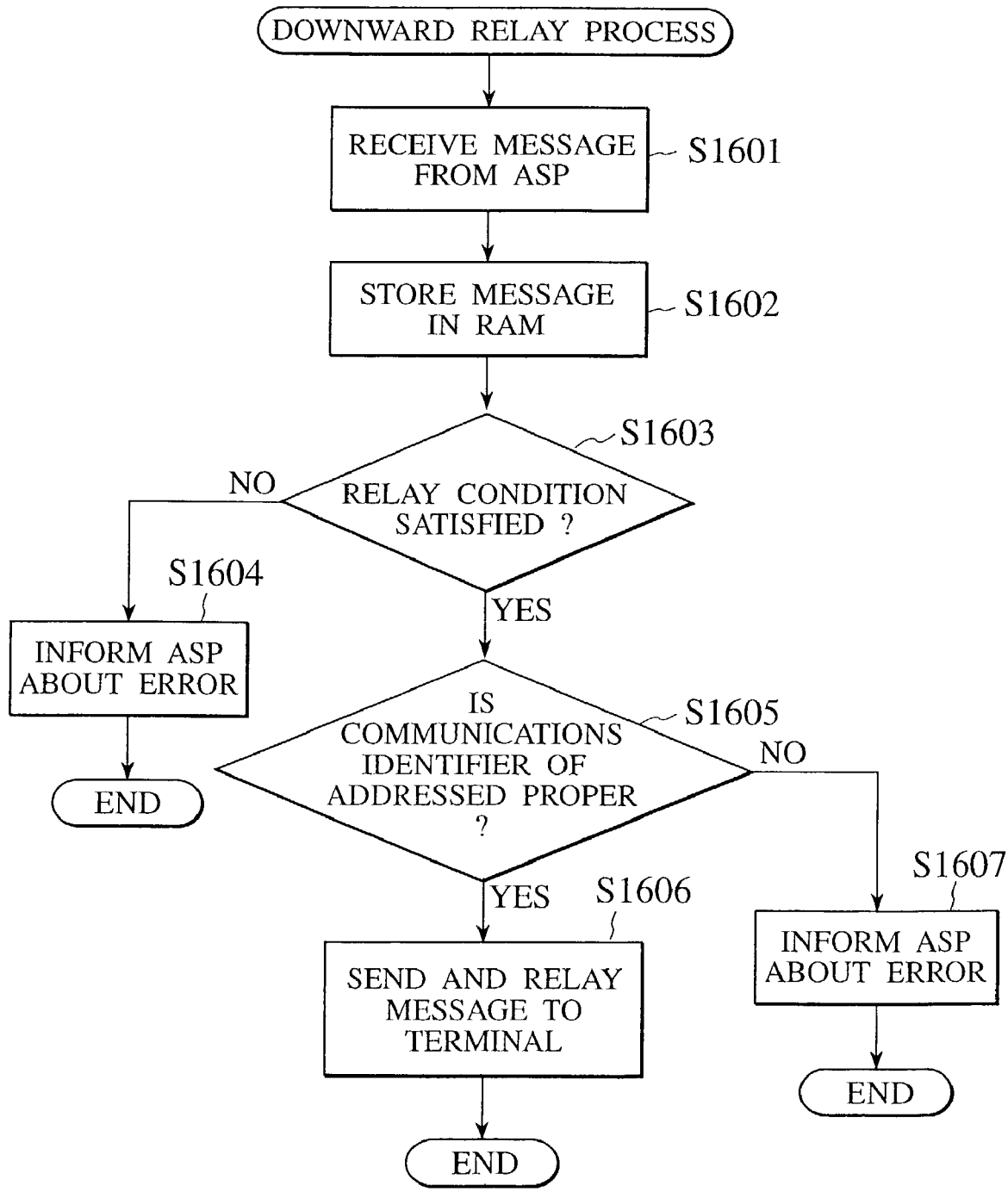
FIG. 16 is a flowchart showing the flow of a downward relay process carried out by the relay device of the present embodiment.

FIG. 16 is a flowchart showing the flow of a downward relay process, wherein the computer 301 shown in FIG. 3 relays a message sent from an ASP in the computer communications network 1151 to the terminal 1171. Description will now be made with reference to FIG. 16.

The downward relay process is activated, if the CPU 302 detects that the message sent from the ASP in the computer communications network 1151 has arrived at the communications-network-side interface 304.

Upon activation of the downward relay process, the CPU 302 receives the message sent from the ASP through the communications-network-side interface 304 (Step S601), and temporarily stores the message in the buffer in the RAM 307 (Step S1602).

The CPU 302 checks communications identifiers of the addresser and addressee of the message.

The CPU 302 checks whether the communications identifier of the addresser satisfies a relay condition (Step S1603). This relay condition may be the same as the condition employed in the upward relay process. In this embodiment, the relay condition is satisfied, in the case where any of communications identifiers (a relay-forbiddance IP address) stored in the relay-forbiddance-communications-identifier storage section 1107 in the hard disk 305 does not coincide with the communications identifier of the addresser ASP.

In the case where the relay condition is not satisfied (Step S1603; NO), i.e. in the case where the relaying is not performed, the computer 301 informs the computer communications network 1151 about an error that the message can not be relayed to the corresponding addresser ASP in the computer communications network 1151 (Step S1604), and completing this process.

On the contrary, in the case where the relay condition is satisfied (Step S1603; YES), the computer 301 checks whether the communications identifier of the addressee is one assigned to any one terminal in the above-described connection-start process (Step S1605). In the case where the communications identifier of the addressee is not the one assigned to any one terminal in the connection-start process (Step S1605; NO), the computer 301 informs the addresser ASP of an error that the message can not be relayed to the addresser (Step S1607), and completing the present process.

In the case where the communications identifier of the addressee is the one assigned to any one terminal (Step S1605; YES). The computer 301 sends and relays the corresponding message to the terminal 1171 through the terminal-side interface 303 (Step S1606), and completing the present process.

Other than the above, in any of the upward relay process and the downward relay process, the relay condition may be set to be satisfied in the following cases.

The first method is as follows: The relay-forbiddance-communications-identifier storage section 1107 stores, as relay-forbiddance patterns, bit masks and IP addresses, to which the message is not relayed and which have bit masks which are set.

For example, in the case where a value "255.255.255.0" is specified as a bit mask and a value "144.3.14.0" is specified as an IP address to which a message is not to be relayed, IP addresses from "144.3.14.0" to "144.3.14.255" match with the relay-forbiddance patterns. The relaying is not performed to any ASPS having the above IP addresses. Hence, in the case where the communications identifier of the addressee for communications does not match with any of the relay-forbiddance patterns, the relay condition is satisfied.

The second method is as follows: The relay-forbiddance IP address or relay-forbiddance pattern can be set for each user. Each user can be investigated based on the user name received in the above-described connection-start process. In association with the received user name, the relay-forbiddance IP address or the relay-forbiddance pattern is stored in the relay-forbiddance-communications-identifier storage section 1107.

The user name of a user who uses a terminal is investigated based on the IP address of the terminal which is included in the message. In the case where the communications identifier of the addressee of the communications does not match with a relay-forbiddance IP address or relay-forbiddance patter of this user, the relay condition is satisfied.

In this case, if the user uses a program, such as a CGI (Common Gateway Interface) script prepared in the ISP from the browser, thereby directly managing the adding, changing or deleting of the relay-forbiddance IP address or relay-forbiddance pattern.

Depending on the type of the contract between the user and the ISP, the relay-forbiddance IP address or the relay-forbiddance pattern may be changed. For example, the more the service charge of the contract is expensive, the lesser the number of the relay-forbiddance IP address or relay-forbiddance pattern.

The third method is as follows: In the above embodiment, it is set that "relay-forbiddance information" is stored. However, in this embodiment, "relay permission information" is stored. That is, a relay-permission IP address or a relay-permission patter can be stored. In the case where the IP address matches with the relay-permission IP address or the relay-permission pattern, the relay condition is satisfied. Such an address or pattern may be set distinctively for each user or may commonly be set among all users. Since the user can connect only to a permissible ASP, the advertisement effect of this ASP can be enhanced. This may prevent the entry of any other ASPs, competing with the permissible ASP, into the share. The present method is effective, in the case where the ASP shoulders the connection charge toward the ISP for the user so as to realize a free-network connection service.

Such methods for relay conditions may individually be adopted or be combined together, and both cases are included in the scope of the present invention.

Figure 17:
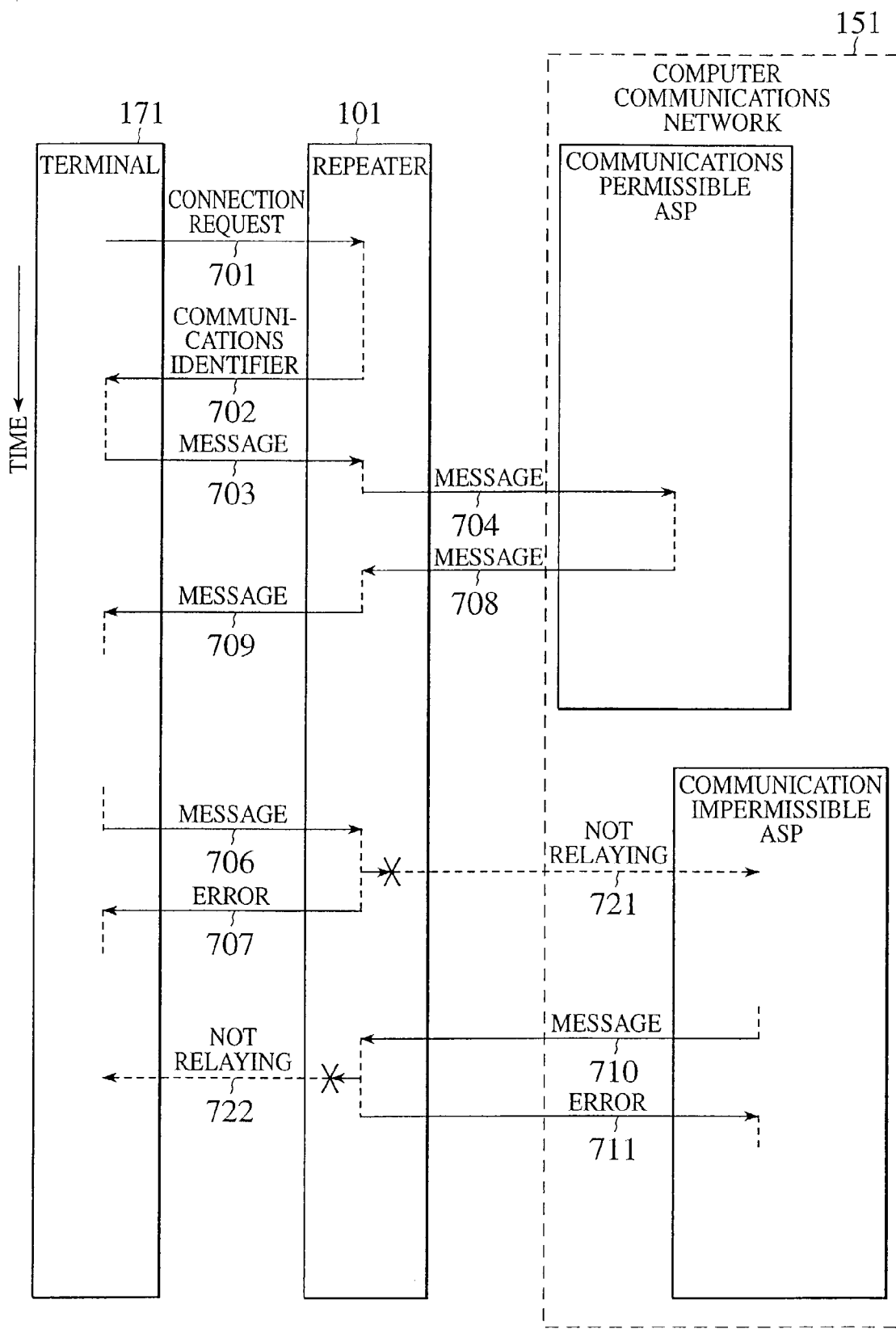
FIG. 17 is an explanatory diagram showing an example, wherein messages are relayed between a terminal and an ASP in a communications network by the relay device of the present embodiment.

FIG. 17 is an explanatory diagram showing a typical example, wherein a message is relayed between the terminal 1171, the computer 301 (the relay device 1101), and communication-permissible ASP and communication-impermissible ASP in the computer communications network 1151.

Once the terminal 1171 sends a connection request to the computer 301 (701), the computer 301 assigns this terminal 1171 a communications identifier (702). Upon arrival (703) of a message addressed to the communication-permissible ASP at the computer 301 from the terminal 1171 to which the communications identifier is assigned, this message is send and relayed (704) to the computer communications network 1151 through the computer 301, and arrives at the communications permissible ASP. Even if a message addressed to the communications-impermissible ASP arrives at the computer 301 (706), the computer 301 does not relay the message (721), and informs (707) the terminal 1171 that the relaying is not performed.

Upon arrival (708) of the message addressed to the terminal 1171 from the communications-permissible ASP at the computer 301, this message is sent and relayed to the computer communications network 1151 through the computer 301 and arrives at the terminal 1171 (709). Even if the message from the communications-impermissible ASP arrives at the computer 301 (710), the computer 301 does not relay the message (722), and informs the communications-impermissible ASP that the relaying can not be performed (711).

The TCP/IP communications is a form of communications, wherein information as to whether data has arrived or not is certainly transmitted. Hence, in the case where the relaying of a message is not performed, the computer 301 needs to inform the addresser that the corresponding message can not be relayed.

In this manner, according to the relay device 1101 of the present invention, the terminal 1171 can be provided with connection to a computer communications network having access control.

(Embodiment for Assigning One User Name a Plurality of Relay Conditions)

In the above-described embodiment, the relay-forbiddance IP address or relay-forbiddance pattern may be stored in association with each user. In this embodiment, a plurality of passwords (including not only currently-used keywords, but also passwords employing a conversion rule), and "user name" of the above-described embodiment is replaced with "a combination of a user name and a password".

In addition to the dial-up connection using a telephone line, in connection to an Internet communications network using a CATV (CAble TeleVision) line, each family may commonly use a single user name. In this case, the contract (usually, the head of the family) pays for the connection charge to the ISP.

In such a case where a single user name is shared in a family, the parents may connect to the ISP without access control, while controlling the accessing of their kids to adults-only pages, pages including business-deals matters, such as mail-order selling, etc., pages from overseas.

There may be set different passwords between the parents and their kids, there is no access control for the relay-forbiddance IP address and the relay-forbiddance pattern corresponding to "the user name and the parents password". The IP addresses of the above-described undesirable servers are specified as the relay-forbiddance IP address and the relay-forbiddance patter corresponding to "the user name and the kids password".

In this manner, a plurality of passwords are prepared for a single user name, and the relay-forbiddance IP address and the relay-forbiddance IP pattern, etc. are stored for the pair of "the user name and the password", thereby clearing up various problems occurring in the case where the same user name is shared in a family.

(Application of the Present Invention in Continuous-Connection Environment)

In the above-described embodiments, the description has been made to the example, wherein the ISP serves as a dial-up server and DHCP server of the terminal. However, in the context wherein the continuous-connection environment is settled, the present invention can be adopted as follows: In this case, the ISP serves as a so-called gateway.

That is, a fixed IP address is assigned in advance to a user terminal. It is identified whether the user of the terminal began the accessing to the server. In the case where the user has began the accessing, the user is asked to input the user name, and user authentication is performed.

In the case where successful authentication is made, the communications-identifier assignor assigns the terminal an IP address of the terminal as a communications identifier "authenticated IP address".

In the case where there is a terminal which intends to use an ISP as a gateway, the ISP checks the IP address of the terminal. In the only case where the checked is the "authenticated IP address", the ISP relays the communications.

Periodically, the authentication is performed. In the case of a failure in the authentication, the "authenticated IP address" assigned to the terminal gets invalidated. Thus, the communications relaying for the terminal can not be performed.

By employing such an embodiment, unnecessary accesses from an intranet to the Internet can be reduced, and preventing from being externally accessed. In addition, if the IP addresses are recorded, the investigation of whether there is any external accesses may be made.

The user authentication of the user in the terminal can be performed using a predetermined WWW form in accordance with a CGI script technique. This WWW form is handled as a so-called "portal" for accessing to the Internet, thereby enhancing the spreading of advertisement or information matters, promoting the community, and attempting the wide usage of the Internet application.

INDUSTRIAL APPLICABILITY

As explained above, according to the present invention, billing information for a service provided from an ASP in the Internet to the user is managed only an ISP which connects the user terminal to the Internet. The present invention is preferable for not leaking information, such as user's credit-card information, etc. The present invention can realize a communication system, a relay device, a service provider, a relaying method, a service providing method and a program product for realizing these, which are all suitable for a dial-up server providing terminals with connections to a computer communications network, such as the Internet, with access control.

The patent application claims the Paris Convention Priority based on Japanese Patent Application No. 2000-20985 and No. 2000-22088 filed with the Japan Patent Office on Jan. 31, 2000, the complete disclosure of which is hereby incorporated by reference.

The invention claimed is:

1. A communication system including a terminal, a relay device, and a service provider, wherein:
    (a) said terminal sends a user name to said relay device;
    (b) said relay device receives the user name from said terminal, generates an authentication character string randomly, and sends the authentication character string to said terminal;
    (c) said terminal receives the authentication character string, shows the authentication character string to the user in association with the user name, allows the user to convert the authentication character string into a password-character string, and sends a password-character string input by the user to said relay device;
    (d) said relay device receives the password-character string from said terminal, and assigns said terminal a communication identifier in association with the user name in a case where the password-character string is equal to a character string converted from the authentication character string based on a rule in association with the user name;
    (e) said terminal sends a service-request message, whose addresser corresponds to the assigned communication identifier and addressee corresponds to a communication identifier of said service provider, to said relay device;
    (f) said relay device receives the service-request message from said terminal, and sends the service-request message to said service provider;
    (g) said service provider receives the service-request message from said relay device, and sends an inquiry message for inquiring whether to provide a service to the communication identifier specified in the service-request message, to said relay device;

(h) said relay device receives the inquiry message, and sends a response message, to said service provider, specifying to provide a service, in a case where the communication identifier specified in the inquiry message has been assigned in association with the user name, and, if not, specifying not to provide a service;

(i) said service provider receives the response message from said relay device, and sends a service-providing message, whose addressee corresponds to the communication identifier specified in the service-request message in a case where the response message specifies to provide a service and whose addresser is said service provider, to said relay device;

(j) said relay device receives the service-providing message from said service provider, and sends this to said terminal; and (k) said terminal receives the service-providing message from said relay device.

2. The communication system according to claim 1, wherein:

the inquiry message or the service-providing message includes billing information of the service to be provided; and said relay device stores the billing information corresponding to the user name corresponding to the assigned communication identifier; and in a case where to send the service-providing message to said terminal, adds or sums the billing information of the service to be provided, included in the inquiry message or the service-providing message, to or with the billing information stored in association with the user name, so as to update the billing information stored in association with the user name.

3. The communication system according to claim 1, wherein: said terminal, said relay device and said service provider perform communications using TCP/IP (Transmission Control Protocol/Internet Protocol), and the communication identifier is specified based on an IP address and/or a port number.

4. A relay device which is communicable with a terminal and a service provider, comprising:

a user-name receiver which receives a user name sent from said terminal;

a communication-identifier assignor which assigns said terminal a communication identifier in association with the received user name;

a service-request message receiver which receives a service-request message, whose addresser corresponds to the assigned communication identifier and addressee corresponds to a communication identifier of said service provider and which is sent from said terminal;

a service-request message sender which sends the received service-request message to said service provider;

an inquiry-message receiver which receives an inquiry message for inquiring whether to provide a service to the communication identifier specified in the sent service-request message, the inquiry message being sent from said service provider;

a response-message sender which sends, to said service provider, a response message specifying to provide a service in a case where the communication identifier specified in the received inquiry message is assigned in association with the received user name, and, if not, specifying not to provide a service;

a service-providing message receiver which receives a service-providing message for providing a service to the communication identifier assigned in association the received user name, said service-providing message being sent from said service provider;

a service-providing message sender which sends the received service-providing message to said terminal;

an authentication-character-string generator/sender which generates an authentication character string randomly, and sends this to said terminal for conversion of the authentication character string into a password-character string, in a case where the user name is received by said user-name receiver;

a password-character string receiver which receives the password-character string sent from said terminal; and a rule storage section which stores a rule for generating the password-character string from the authentication character string, in association with the user name, and wherein said communication-identifier assignor assigns said terminal the communication identifier, in a case where the password-character string received by said password-character string receiver is equal to the string converted from the authentication character string generated by said authentication-character-string generator/sender, based on the rule stored in said rule storage section in association with the user name received by said user-name receiver.

5. The relay device according to claim 4, wherein the inquiry message or the service-providing message includes billing information of the service to be provided, and said relay device further comprises a billing-information storage section which stores the billing information in association with the received user name; and a billing-information updating section which adds or sums the billing information of the to-be-provided service included in the inquiry message or the service-providing message, to or with the billing information stored in association with the received user name, in a case where said service-providing message sender sends the service-providing message to said terminal, so as to update said billing-information storage section.

6. The relay device according to claim 5, wherein updating by said billing-information updating section is performed before sending of the response message by said response-message sender.

7. The relay device according to claim 5, wherein updating by said billing-information updating section is performed before sending of the service-providing message by said service-providing message sender.

8. The relay device according to claim 5, further including a service-received message receiver which receives a service-received message sent from said terminal, in a case where said terminal receives the service-providing message sent from said service-providing message sender, and wherein updating by said billing-information updating section is performed after receiving of the service-received message by said service-received message receiver.

9. The relay device according to claim 4, wherein;

said communication-identifier assignor assigns said terminal a communication identifier, in a case where the user name is received by said user-name receiver; and said relay device further comprises a communication-identifier invalidating section which invalidates the communication identifier assigned by said communication-identifier assignor to said terminal, in a case where the password-character string received by said password-character string receiver is not generated from the authentication character string generated by said authentication-character-string generator/sender, based on the rule stored in said rule storage section in association with the user name received by said user-name receiver.

10. The relay device according to claim 4, wherein sending and receiving of the message is performed using TCP/IP (Transmission Control Protocol/Internet Protocol), and the communication identifier is specified based on an IP address and/or a port number.

11. A relaying method of relaying communications between a terminal and a service provider, comprising:
   a user-name receiving step of receiving a user name sent from said terminal;
   a communication-identifier assigning step of assigning said terminal a communication identifier in association with the received user name;
   a service-request message receiving step of receiving a service-request message, whose addresser corresponds to the assigned communication identifier and addressee corresponds to a communication identifier of said service provider, and which is sent from said terminal;
   a service-request message sending step of sending the received service-request message to said service provider;
   an inquiry-message receiving step of receiving, from said service provider, an inquiry message for inquiring whether to provide a service to a communication identifier specified in the sent service-request message, the inquiry message being sent from said service provider;
   a response-message sending step of sending, to said service provider, a response message specifying to provide a service in a case where the communication identifier specified in the received inquiry message is assigned in association with the received user name, and, if not, specifying not to provide a service;
   a service-providing message receiving step of receiving, from said service provider, a service-providing message for providing a service to the communication identifier assigned in association with the received user name;
   a service-providing message sending step of sending the received service-providing message to said terminal
   an authentication-character-string generating/sending step of generating an authentication character string randomly and sending this to said terminal for conversion of the authentication character string into a password-character string, in a case where the user name is received at said user-name receiving step; and
   a password-character string receiving step of receiving the password-character string sent from said terminal, and wherein
   said communication-identifier assigning step assigns said terminal the communication identifier, in a case where the password-character string received at said password-character string receiving step is generated from the authentication character string generated at said authentication-character-string generating/sending step, based on a rule stored in advance in association with the user name received at said user-name receiving step.

12. The relaying method of relaying according to claim 11, wherein:
   the inquiry message or the service-providing message includes billing information of the service to be provided; and
said method further comprises
   a billing-information updating step of, in a case where the service-providing message is sent to said terminal at said service-providing message sending step, updating the billing information if there is billing information stored in association with the received user name, by adding the billing information of the service to be provided and specified in the inquiry message or the service-providing message therewith, and, if there is not such information, storing the billing information in association with the user name.

13. The relaying method according to claim 12, wherein updating at said billing-information updating step is performed before sending of the response message at said response-message sending step.

14. The relaying method according to claim 12, wherein updating at said billing-information updating step is performed before sending of the service-providing message at said service-providing message sending step.

15. The relaying method according to claim 12, further including a service-received message receiving step of receiving a service-received message sent from said terminal, in a case where said terminal receives the service-providing message sent at said service-providing message sending step, and wherein
   updating at said billing-information updating step is performed after receiving of the service-received message at said service-received message receiving step.

16. The relaying method according to claim 11, wherein:
   said communication-identifier assigning step assigns said terminal a communication identifier, in a case where a user name is received at said user-name receiving step; and
   said method further includes
   a communication-identifier invalidating step of invalidating the communication identifier assigned to said terminal at said communication-identifier assigning step, in a case where the password-character string received at said password-character string receiving step is not generated from the authentication character string generated at said authentication-character-string generating/sending step based on the rule stored in advance in association with the user name received at said user-name receiving step.

17. A program product for controlling a computer, which is communicable with a terminal and a service provider, to serve as:
   a user-name receiver which receives a user name sent from said terminal;
   a communication-identifier assignor which assigns said terminal a communication identifier in association with the received user name;
   a service-request message receiver which receives a service-request message, whose addresser corresponds to the assigned communication identifier and addressee corresponds to a communication identifier of said service provider, and which is sent from said terminal;
   a service-request message sender which sends the received service-request message to said service provider;
   an inquiry-message receiver which receives an inquiry message for inquiring whether to provide a service to a communication identifier specified in the sent service-request message, the inquiry message being sent from said service provider;
   a response-message sender which sends, to said service provider, a response message specifying to provide a service in a case where the communication identifier specified in the received inquiry message is assigned in association with the received user name, and, if not, specifying not to provide a service;

a service-providing message receiver which receives a service-providing message for providing a service to the communication identifier assigned in association with the received user name, the service-providing message being sent from said service provider; and a service-providing message sender which sends the received service-providing message to said terminal;

an authentication-character-string generator/sender which generates an authentication character string randomly, and sends this to said terminal for conversion of the authentication character string into a password-character string, in a case where the user name is received by said user-name receiver;

a password-character string receiver which receives the password-character string sent from said terminal; and a rule storage section which stores a rule for generating the password-character string from the authentication character string, in association with the user name, and wherein said communication-identifier assignor assigns said terminal the communication identifier, in a case where the password-character string received by said password-character string receiver is equal to the string converted from the authentication character string generated by said authentication-character-string generator/sender, based on the rule stored in said rule storage section in association with the user name received by said user-name receiver.

18. The program product according to claim 17, wherein the inquiry message or the service-providing message includes billing information of the service to be provided, and said program product for controlling said computer to further serve as:

a billing-information storage section which stores billing information association with the received user name; and a billing-information updating section which updates said billing-information storage section, by adding or summing billing information of the service to be provided specified in the inquiry message or the service-providing message into said billing-information storage section in association with the received user name, in a case where the service-providing message is sent to said terminal by said service-providing message sender.

19. The program product according to claim 18, wherein, in said computer, updating by said billing-information updating section is performed before sending of the response message by said response-message sending section.

20. The program product according to claim 18, wherein, in said computer, updating by said billing-information updating section is performed before sending of the service-providing message by said service-providing message sender.

21. The program product according to claim 18, for controlling said computer to further serve as a service-received message receiver which receives a service-received message sent from said terminal, in a case where said terminal receives the service-providing message sent by said service-providing message sender, and wherein, in said computer, updating by said billing-information updating section is performed after receiving of the service-received message by said service-received message receiver.

22. The program product according to claim 17, wherein, in said computer, said communication-identifier assignor assigns said terminal a communication identifier, in a case where the user name is received by said user-name receiver, and said program product controlling said computer to further serve as a communication-identifier invalidating section which invalidates the communication identifier assigned by said communication-identifier assignor to said terminal, in a case where the password-character string received by said password-character string receiver is not generated from the authentication character string generated by said authentication-character-string generator/sender, based on the rule stored in said rule storage section in association with the user name received by said user-name receiver.

* * * * *